United States Patent [19]

Hall

[11] Patent Number: 4,743,821

[45] Date of Patent: May 10, 1988

[54] PULSE-WIDTH-MODULATING FEEDBACK CONTROL OF ELECTROMAGNETIC ACTUATORS

[75] Inventor: Shawn A. Hall, Pleasantville, N.Y.

[73] Assignee: International Business Machines Corporation, Armonk, N.Y.

[21] Appl. No.: 918,447

[22] Filed: Oct. 14, 1986

[51] Int. Cl.[4] .............................................. G05B 11/28

[52] U.S. Cl. .................................... 318/599; 318/561; 318/567; 400/124; 101/93

[58] Field of Search ............... 318/561, 599, 340, 606, 318/811, 567; 101/93, 93.01, 93.02, 93.03; 400/54, 74, 124 TC, 157.3, 719, 166, 167

[56] References Cited

U.S. PATENT DOCUMENTS

| | | | |
|---|---|---|---|
| 3,513,774 | 5/1970 | Pawletko et al. | 101/93 |
| 3,678,847 | 7/1972 | Pear et al. | 101/93 |
| 3,789,393 | 1/1974 | Tripp | 318/599 |
| 3,834,306 | 9/1974 | Gilbert et al. | 101/93 |
| 4,162,131 | 7/1979 | Carson et al. | 400/124 |
| 4,192,230 | 3/1980 | Blom et al. | 101/93.03 |
| 4,259,903 | 4/1981 | Arendt et al. | 101/93.03 |
| 4,278,021 | 7/1981 | Nakano et al. | 101/93.03 |
| 4,280,404 | 7/1981 | Barrus et al. | 101/93.03 |
| 4,293,233 | 10/1981 | Hoffman | 400/144.2 |
| 4,333,398 | 6/1982 | Carson et al. | 101/93.02 |
| 4,347,786 | 9/1982 | Sweat, Jr. et al. | 400/157.3 |
| 4,353,656 | 10/1982 | Sohl et al. | 400/157.3 |
| 4,407,193 | 10/1983 | Hall et al. | 101/93.01 |
| 4,429,342 | 1/1984 | Heider | 361/152 |
| 4,440,079 | 4/1984 | Dayger et al. | 101/93.03 |
| 4,547,087 | 10/1985 | Heider et al. | 400/157.3 |
| 4,597,328 | 7/1986 | Carrington et al. | 101/93.03 |

*Primary Examiner*—William M. Shoop, Jr.
*Assistant Examiner*—D. Martin
*Attorney, Agent, or Firm*—Carl C. Kling; Philip J. Feig

[57] ABSTRACT

The trajectory of an electromagnetic actuator is adjusted by pulse-width-modulating feedback control of the waveform which energizes the coil. As applied to actuators for impact printing, the objectives of the control scheme are to regulate the armature's time of flight and its velocity at impact, in spite of disturbances, thereby to provide higher-quality printing at increased speed. Each actuation is produced by energizing the coil with a series of pulses. Regulation is accomplished under microprocessor control by measuring the state variables of the system—armature position, armature velocity, and coil current—at the beginning of each pulse, comparing these measurements to ideal values, and modulating the width of the pulse as a function of the errors. In general, the appropriate functional relationship between the measured errors and the pulse-width modulation is nonlinear, and is different for each pulse in the series. Systematic means for determining these relationships are given.

7 Claims, 14 Drawing Sheets

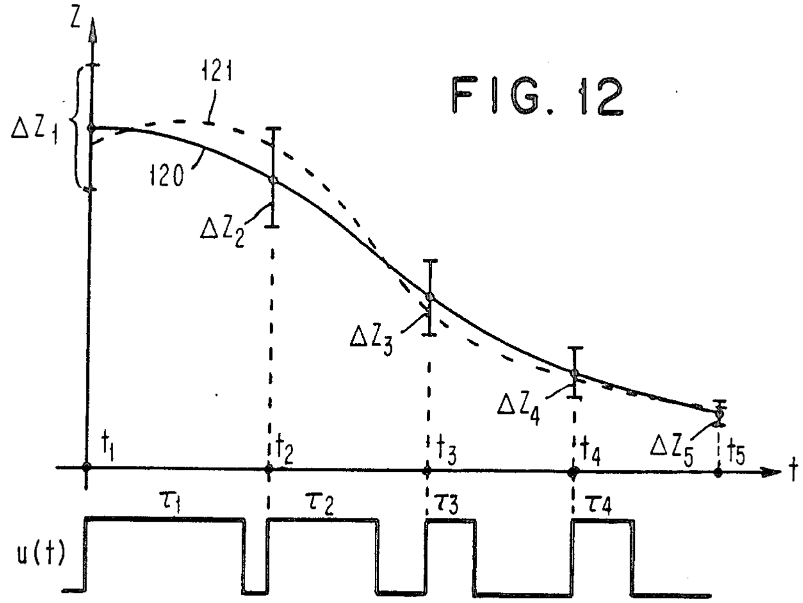
FIG. 12
FIG. 13
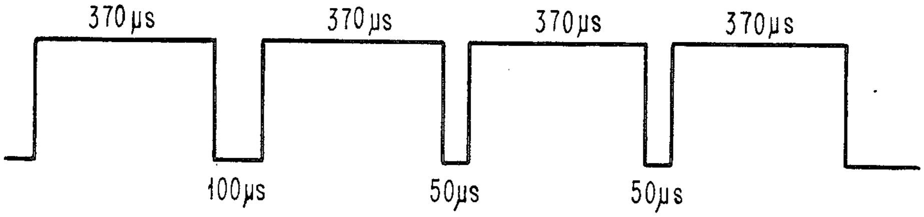

PULSE-WIDTH-MODULATING FEEDBACK CONTROL OF ELECTROMAGNETIC ACTUATORS

BACKGROUND OF THE INVENTION

1. Field of the Invention

This invention relates to feedback control of electromagnetic actuators, and more particularly relates to feedback control of actuators for impact printing, by means of pulse-width modulation of the coil-energizing waveform, based on one or more measurements of state variables.

2. Prior Art

In impact printing, a mass is accelerated, typically by electromagnetic means, toward a rigid platen, with paper and inked ribbon intervening. Sometimes, as in engraved band line printers, a type carrying element also intervenes. In any case, ink is transferred to the paper at the instant when these various elements are compressed between the accelerating mass and the platen. The force of compression (the "impact force") is controlled by the speed of the accelerating mass just prior to impact (the "impact velocity"). Therefore, to produce high quality printing of uniform darkness, it is necessary to regulate the impact velocity: too low an impact velicty will cause the printed image to be too light, while too high an impact velocity may cause the paper to "punch through," and may also damage the ribbon.

In many impact printers, it is also necessary to regulate "flight time"—the interval which elapses between the beginning of an actuation and the impact, because there is lateral motion between the various elements involved in the impact. For example, in an engraved band line printer, the band moves laterally at high velocity with respect to the hammer, paper, ribbon and platen; in a serial wire matrix printer, the wire moves laterally with respect to the paper. Thus if flight time varies too much from the expected, nominal value, then the printed mark may be noticeably misplaced on the paper. In the case of engraved band printers, the character may also be truncated on one side or the other. In general, the required precision of flight time regulation increases in proportion to the speed of the lateral motion. Typically, the greatest precision is needed in engraved band line printers, where the lateral speed of the band is typically many meters per second; less precision is needed in serial wire matrix printers, where the lateral speed of the carriage is typically less than one meter per second.

In summary, the purpose of controlling an impact-printing actuator is to regulate the trajectory of the accelerating mass (hereafter called "the hammer" or "the armature") to achieve repeatable conditions at impact; in particular, repeatable flight time and impact velocity.

Many disturbances conspire to perturb a hammer's trajectory. For example, if the hammer's repetition rate is high, its position and velocity at the start of each actuation, nominally zero, may be perturbed by "settle-out"—residual vibrations left over from the previous firing. These vibrations are typically damped out, after the return stroke of the armature, by multiple, energy absorbing impacts against a backstop. However, if each actuation is forced to wait for the previous actuation to settle out, the maximum repetition rate of the actuator—and hence the speed of printing—may be unacceptably low. Even when the repetition rate is low, there are still perturbations caused by "mechanical interaction" (residual vibrations left over from previous firings of neighboring hammers); by "magnetic interaction" (stray magnetic flux generated by neighboring hammers); by fluctuations of the supply voltage which drives the coil of the electromagnet; by wear at the impact surfaces; by thermal variations of electrical and mechanical components; and by small variations in frictional forces which occur naturally as a consequence of environmental conditions and the accumulation of dirt.

A number of compensation and control schemes have been disclosed in the prior art to minimize or counteract these sources of perturbation, and thereby to provide faster printing having higher print quality. The following references, arranged chronologically, are representative:

1. Joseph P. Pawletko and Charles O. Ross, "Printer Hammer Compensation," U.S. Pat. No. 3,513,774, IBM Corp., July 1, 1968. (A3, 03, M2).
2. Charles B. Pear Jr. and Joseph A. Ross, "Hammer Firing System for a High-Speed Printer," U.S. Pat. No. 3,678,847, Potter Instrument Co., July 25, 1972. (A2, 01, M1).
3. Richard Lyman Gilbert and Michael David Hryck, "Printer Density Control, " U.S. Pat. No. 3,834,306, IBM Corp., Sept. 10, 1974. (A3, 02, 03, M2).
4. Andrew B. Carson and Michael J. Tuzo, "Drive Circuit for Printing Head," U.S. Pat. No. 4,162,131, General Electric Co., July 24, 1979. (A2, 02, M2).
5. Nico Blom and Jan T. Wor, "Printer, Provided with an Impact Device Comprising a Transducer," U.S. Pat. No. 4,192,230, U.S. Philips Corp., Mar. 11, 1980. (A1, A2, 02, 03, M4).
6. Klaus Arendt, Werner Hasler, and Karl-Heinz Schaller, "Circuit Arrangement for Synchronizing the Times of Occurrence of the Print Hammer Impact with the Arrival of the Print Type at the Print Position, " U.S. Pat. No. 4,259,903, IBM Corp., Apr. 7, 1981. (A3, 03, M2).
7. Hiroshige Nakano, Shigenobu Katagiri, Shinichi Nishino, "Magnetic Interference Prevention System," U.S. Pat. No. 4,278,021, Hitachi Koki Co, Ltd., July 14, 1981. (A3, 03, M2).
8. Gordon B. Barrus and Jerry Matula, "Printer Having Variable Hammer Release Drive," U.S. Pat. No. 4,280,404, Printronix Inc., July 28, 1981. (A2, 02, M2).
9. Mark H. Hoffman, "Printer Control System," U.S. Pat. No. 4,293,233, SCI Systems Inc., Oct. 6, 1981. (A1, 02, M2).
10. Andrew B. Carson and Samuel C. Harris, Jr., "Driving Force Control System for Impact Printer," U.S. Pat. No. 4,333,398, General Electric Co., June 8, 1982. (A2, 01, 02, M4).
11. Robert H. Sweat and William J. Thornhill, "Impact Printer Hammer Flight Time and Velocity Sensing Means," U.S. Pat. No. 4,347,786, IBM Corp., Sept. 7, 1982. (A1, 03, M3).
12. Gordon Sohl, John R. Masters, and John R. Leicht, "Moving Coil, Multiple Energy Print Hammer System Including a Closed-Loop Servo," U.S. Pat. No. 4,353,656, Xerox Corp., Oct. 12, 1982. (A1, 01, 02, M4).
13. David A. Hall and George P. Olson, "Solenoid Impact Print Hammer with Uniform Free Flight Time," U.S. Pat. No. 4,407,193, IBM Corp., Oct. 4, 1983. (A1, 03, M3).

14. Ulrich Heider, "Impact Printing Device with an Improved Print Hammer," U.s. Pat. No. 4,429,342, Siemens Aktiengesellschaft, Jan. 31, 1984. (A1, A2, 01, 02, M4).

15. Douglas A. Dayger, Michael D. Hryck, Dean W. Skinner and Gerald R. Westcott, "Control System for Timing Hammers of Impact Printers," U.S. Pat. No. 4,440,079, IBM Corp., Apr. 3, 1984. (A3, 03, M3).

The foregoing references have been classified in three ways: first by application, to describe the type(s) of printer considered; second by objective, to designate the purpose(s) of the control scheme; and third by methodology, to specify how disturbances are assessed and treated. Classifications appear in the above list at the end of each citation. The following code letters have been used:

Application

A1: Daisy Wheel Printer
A2: Serial Wire-Matrix Printer
A3: Engraved Band Printer Objective o1: Minimize settle-out time
O2: Regulate impact velocity (i.e. impact force)
O3: Regulate flight time Methodology M1: Disturbance-free
M2: Open-loop compensation
M3: Closed-loop feedback on subsequent shots
M4: Closed-loop, real-time feedback The meaning of the various applications and objectives should be clear from the foregoing introduction. The methodologies require discussion, and provide a natural framework in which to review the prior art in detail.

Disturbance-Free (M1)

The first methodology, designated M1 in the list of references, assumes that there are no disturbances at all. For example, reference [2] suggests that settle-out may be minimized by applying a damping pulse as the armature begins its return trip to the backstop. However the damping pulse is fixed in time with respect to the initial actuation pulse, so its effectiveness is easily affected by distrubances, such as variations in paper properties, which may alter the actuator's trajectory. Therefore, such a methodology represents an unrealistic way of producing good results in practice.

Open Loop Compensation (M2)

The second methodology, open-loop compensation, designated M2 in the list of references, involves measuring one or more sources of disturbance—either ambient conditions like temperature or supply voltage, or the sequence of print commands itself—and then compensating for anticipated, undesirable effects by altering the actuator's driving waveform as a predetermined function of the disturbance. Seven of the references above [1, 3, 4, 6, 7, 8, 9] use this methodology.

Two of these [1, 6] describe engraved band line printers in which deviations from nominal ambient conditions (e.g. temperature, supply voltage, band velocity) are measured just before the hammer is fired. From these measurements, the anticipated flight time error is calculated according to some predetermined relationship, and is compensated by advancing or retarding the firing point of the hammer.

Similarly, in reference [3], fluctuations in supply voltage are measured. From this measurement, the anticipated flight time error and impact-force error are both calculated. To eliminate the flight time error, the band velocity is modulated; to eliminate the impact-force error, the pulse width delivered to the drive coil is modulated. Both modulations occur according to predetermined relationships.

Reference [8] describes a dot-matrix printer in which the various actuators have shared magnetic paths, and therefore a great deal of magnetic interaction. To control the print force despite this, it is necessary, just before firing, to count the number of hammers to be fired simultaneously, and to modulate the pulse width accordingly.

Reference [4] describes a dot-matrix printer in which the print force varies at high repetition rate, on account of the slow decay of magnetic flux. To counteract this variation, the repetition rate (i.e. the time since last actuation) is constantly monitored. If the repetition rate exceeds a certain critical threshold, the width of the driving pulse is modulated to compensate.

All of these open-loop control schemes have limited practical usefulness, because they are totally blind to unanticipated forms of disturbance: they assume that all sources of perturbation are identified a priori, and that their effects are quantified a priori. Thus they lack the principle benefit of closed-loop control: regulation against all sources of disturbance, anticipated or not.

Closed-Loop Feedback on Subsequent Shots (M3)

The third methodology, designated M3 in the list of references, involves measuring the effects of disturbances directly—for example, the errors in flight time or impact force—and compensating for them in the future by changing the firing algorithm on subsequent actuations.

Three examples of this methodology are included in the reference list [11, 13, 15]. In each of these, flight time is measured, either on every shot [11, 13] or periodically during a recalibration sequence [15]. To regulate flight time, feedback is applied to subsequent shots in a variety of ways, either by modulating the pulse width [11], or by advancing or retarding the firing point [15], or by modulating the cutoff amplitude of the current waveform [13].

These control schemes, representative of methodology M3, are of limited usefulness in practice because they are only effective in combatting slowly-varying disturbances, such as long-term temperature variations, long-term voltage drift, and wear. They are powerless against disturbances which depend on the print stream (e.g. settle-out and interaction) and against disturbances which are random (e.g. variations in frictional forces), because measurements of such disturbances for one actuation give no indication of what will happen on subsequent actuations.

Closed-Loop, Real-Time Feedback (M4)

The fourth methodology, designated M4 in the list of references, is true, closed-loop feedback control: perturbations are assessed by measuring the hammer's trajectory in mid-flight, and correcting it on the fly. This approach, adopted in the present invention, avoids the limitations and deficiencies of the other approaches. In particular, it avoids the deficiency of open-loop compensation (methodology M2), because unexpected disturbances are handled naturally: there is no need to identify each source and quantify each effect a priori. It also avoids the deficiency of closed-loop feedback on subsequent shots (methodology M3), because it can counteract disturbances which are random—settle out, interaction and voltage fluctuations—as well as those which are slowly varying.

In the prior art referenced above, four examples of this methodology exist [5, 10, 12, 14]. Nevertheless, this prior are has limitations and restrictions, in application and objective as well as in methodology, which are overcome by the current invention.

Reference [14] describes a plunger-type actuator in which a simple, on-off position sensor is used to measure the time at which the hammer crosses a fixed position, somewherein mid-stroke. This yields an estimate of the average velocity over the first part of the trajectory, and is used to modulate the pulse width of the driving waveform, for the purpose of controlling impact velocity. Additionally, on the return stroke, a braking pulse is employed to minimize settle-out time.

In contrast to the present invention, reference [14] makes no attempt to control flight time (objective O3). Moreover, the control scheme suggested in reference [14] is very crude, since it is based on one measurement of position only. This measurement does not uniquely define the state of the hammer (as discussed in detail later), and therefore there is no guarantee that the objective of impact-velocity regulation (objective O2) will actually be achieved.

Reference [12] describes a daisy-wheel printer employing a moving-coil actuator, in which an electromagnetic coil moves perpendicular to a fixed magnetic field. The back-EMF of the moving coil is exploited as a built-in velocity sensor. This velocity signal is integrated to obtain a position signal. These position and velocity signals are compared to corresponding ideal waveforms (which are stored digitally) and classical, analog servo techniques are used to control the trajectory. The objectives are to improve print quality by regulating impact velocity, and to increase repetition rate by minimizing settle-out time and by minimizing (but not regulating) flight time. To accomplish these objectives, the print hammer is first driven to a velocity higher than that desired at impact, then is decelerated to the desired impact velocity, and on the return stroke, is retarded by a controlled braking pulse.

In contrast to the present invention, the technique disclosed in reference [12] is not intended to regulate flight time (objective O3). Moreover, the disclosed control scheme is limited to moving-coil actuators—linear devices in which the driving force is a linear function of applied current, and which are therefore fairly easy to control by elementary means. In contrast, the present invention applies to any actuator, including clapper-, plunger-, and solenoid-type actuators, in which the driving force may typically be applied in one direction only, as a nonlinear, time-varying function of current. Such actuators predominate in impact printing applications, having proven advantages of low cost and easy, versatile packaging. Therefore the means to control such actuators, as disclosed in the present invention, represent a significant advantage over the prior art.

Reference [10] describes a matrix printer employing a moving-coil actuator, in which the back-EMF is used as a velocity sensor, but in a cruder way than in reference [12], since only the zero-crossings of velocity are sensed. This information is used to implement two different schemes, depending on the interval $\sigma$ between two successive actuations. The first scheme, used when $\sigma$ is sufficiently large, brings the armature to rest before the onset of the next actuation by means of a damping pulse of fixed width T, which is initiated some fixed time after the armature's velocity changes sign in the midst of the first bounce from the backstop. Since the damping pulse creates a magnetic force which opposes the armature's velocity, it acts to arrest the motion. Thus, in this case, the control scheme serves only to minimize settle-out time. A different scheme is used when $\sigma$ is too small to permit the full duration T of the damping pulse. In this case, a second shot is fired in the midst of settle-out, without sacrificing print-force uniformity of the second impact. As a side-benefit, this technique seeks to transform the nuisance of settle-out into an advantage, by utilizing its residual energy for the second actuation, thereby increasing the efficiency of the actuator. To implement this, the width of the drive pulse $T_D$, applied immediately after the damping pulse, is made a function of the damping pulse width $T_S$—the shorter the damping pulse, the shorter the drive pulse—because nominally, the energy to be replaced by the drive pulse is proportional to the energy which has been dissipated by the damping pulse. However this portion of the algorithm is completely open loop (methodology M2 rather than M4), since the relationship between $T_D$ and $T_S$ is fixed a priori, not subject to correction by actual measurement of the trajectory.

The present invention is distinguished from that disclosed in reference [10] in ways similar to those discussed above regarding reference [12]: reference [10] deals only with moving-coil actuators, and does not seek to control flight time.

Reference [5] describes two embodiments of solenoid-type actuators in which a permanent magnet is mounted on the armature in the vicinity of a sensing coil, thereby yielding an analog signal proportional to the armature's velocity. The first embodiment is a daisy-wheel actuator in which the drive coil is shut off when the armature velocity, monitored by the sensing coil, becomes equal to some reference velocity. Thus impact velocity is regulated. The second embodiment is a dot-matrix actuator, in which it is desired to regulate not only impact velocity, but flight time. Impact velocity is regulated as in the daisy-wheel embodiment: by shutting off the drive coil when the armature velocity becomes equal to some reference velocity $v_n$, as measured by the sensing coil. Flight time is regulated by a more complicated scheme: as each shot is fired, the cutoff amplitude $I_n$ of the current in the drive coil is set as a linear function of the armature's initial position and velocity, where position is reckoned as the time integral of the velocity signal. As a result, the desired terminal speed $v_n$ is reached some time before impact and the armature coasts the remainder of the stroke at this fixed speed $v_n$, arriving at the impact point at the correct time. An electrical schematic is presented to implement this feedback loop in an analog fashion.

In contrast to the present invention, reference [5] attempts to control flight time using only one control decision, and bases the decision entirely on one measurement of the armature's position and velocity at the beginning of the stroke. There are several limitations and disadvantages to this scheme. First, since the measurements are taken at the beginning of the trajectory, perturbations which occur during the trajectory, such as variations in frictional forces, cannot be compensated. Second, since only one measurement of position and velocity is made, the algorithm is very sensitive to the accuracy of this measurement. Third, since current in the coil is not measured, perturbations of current, which may affect flight time significantly, cannot be compensated. Fourth, since the algorithm makes only one decision during the trajectory (i.e. setting the cutoff amplitude of the current waveform), flight time accuracy is very sensitive to the accuracy of that decision. Fifth, since the cutoff amplitude of the current waveform is strictly a linear function of the measured errors, its usefulness is limited to very special cases. In other words, the algorithm is neither very general, nor very robust.

SUMMARY OF THE INVENTION

An object of the present invention is to provide a high-speed electromagnetic actuator in which critical features of the armature's trajectory, such as flight time and impact velocity, are regulated to a comparatively high degree of accuracy, in spite of disturbances caused by settle out, interaction, voltage and temperature fluctuations, wear, frictional-force variations and the like.

Another object of the invention is to specify the format of a pulse-width-modulating, feedback-control algorithm which can accomplish the desired regulation.

Yet another object of the invention is to describe a systematic means of discovering, for any given actuator, the control functions—the functional relationships between measured errors and pulse-width modulation—which are required to implement the feedback-control algorithm.

A feature of the invention is discrete, digital feedback control, in which the width of the pulses which energize the actuator's coil are modulated, in real time, based on periodic measurements of the actuator's state throughout the trajectory. The nominal waveform, which consists of one or more rectangular pulses having equal or different pulse widths, must be selected a priori to satisfy the performance requirements of the actuator at hand. Under ideal conditions, this nominal, coil-driving waveform produces the ideal trajectory of the actuator, by definition. However, under non-ideal conditions, the same nominal waveform produces an errant trajectory, and the widths of the various rectangular pulses must be modulated, either lengthened or shortened, in order to steer the errant trajectory toward the ideal trajectory, for the purpose of regulating certain performance criteria, such as flight time and impact velocity. To specify how each pulse width should be modulated, a measurement of the actuator's state variables, including position, velocity, and current, is made at or near the beginning of the pulse, and digitized by an analog-to-digital converter. By means of a microprocessor, these measurements are digitally compared to corresponding values for the ideal trajectory (previously measured and stored during a calibration sequence), and the differences are used to compute a pulse-width modulation for the given pulse, according to a pre-specified function. The value of this function may either be calculated on-the-fly or recovered from a lookup table prepared in advance and stored in memory. In general, this function is nonlinear, and is different for each of the pulses in the driving waveform. The various functions may be determined, for any given actuator, by experimental data collection followed by mathematical regression.

The advantage of the invention is economic implementation of state-variable feedback control for an electromagnetic actuator which is inherently nonlinear.

Another advantage of the invention is the automatic derivation of nonlinear control functions, which permits straightforward application to various types of actuators having various control objectives.

The foregoing and other objects, features and advantages of the invention will be apparent from the more particular description of the preferred embodiment, as illustrated in the accompanying drawings.

BRIEF DESCRIPTION OF THE DRAWINGS

FIG. 12 represents the trajectory of an artificial, first-order system, used for expository purposes to explain a means of defining an acceptance criterion.

FIG. 13 shows the nominal pulse train used for a prototype embodiment.

DESCRIPTION OF THE PREFERRED EMBODIMENT OF THE INVENTION

Overview

Figure 1:
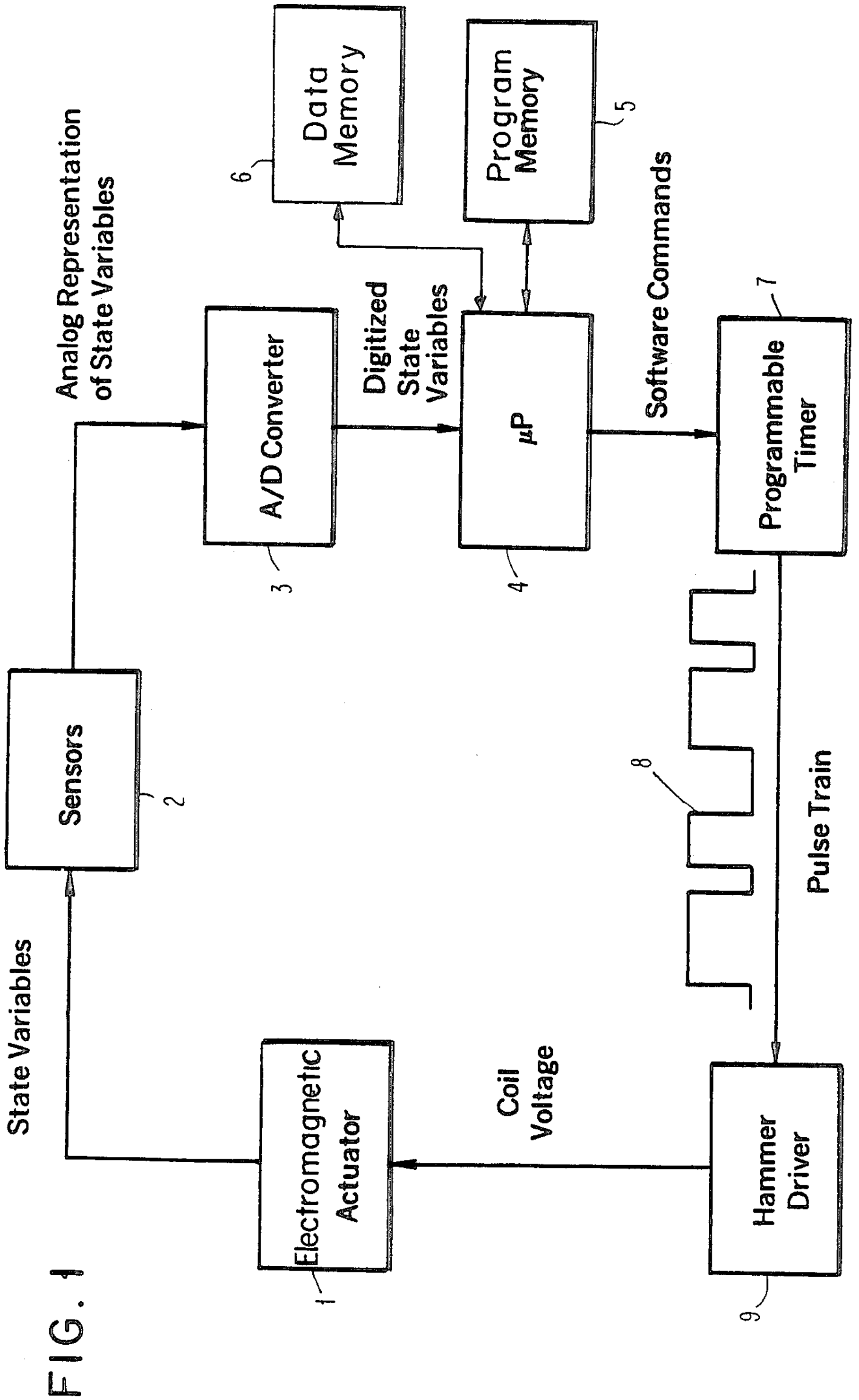
FIG. 1 is a block diagram of the feedback loop.

FIG. 1 is an overall block diagram of the feedback loop. The state variables which describe the electromagnetic actuator 1, including position, velocity and current, are measured by means of sensors 2. Periodically throughout the hammer's trajectory, the analog representations of the state variables are converted to digital form by analog-to-digital converter 3, captured by microprocessor 4, and compared to reference values which define the ideal trajectory, thereby yielding a set of state-variable errors. By means of software residing in program memory 5, and perhaps with the help of lookup tables residing in data memory 6, the digitized errors are converted to software commands which cause programmable timer 7 to produce pulse train 8, in which the width of each pulse is individually tailored, while the hammer is in flight, to compensate for the errors, thereby to achieve the correct flight time and impact velocity. Pulse train 8 energizes hammer driver 9, which may be simply a transistor switch, such that a switched voltage waveform appears across the coil of the actuator and controls the hammer's motion.

Description of the Actuator

Figure 2:
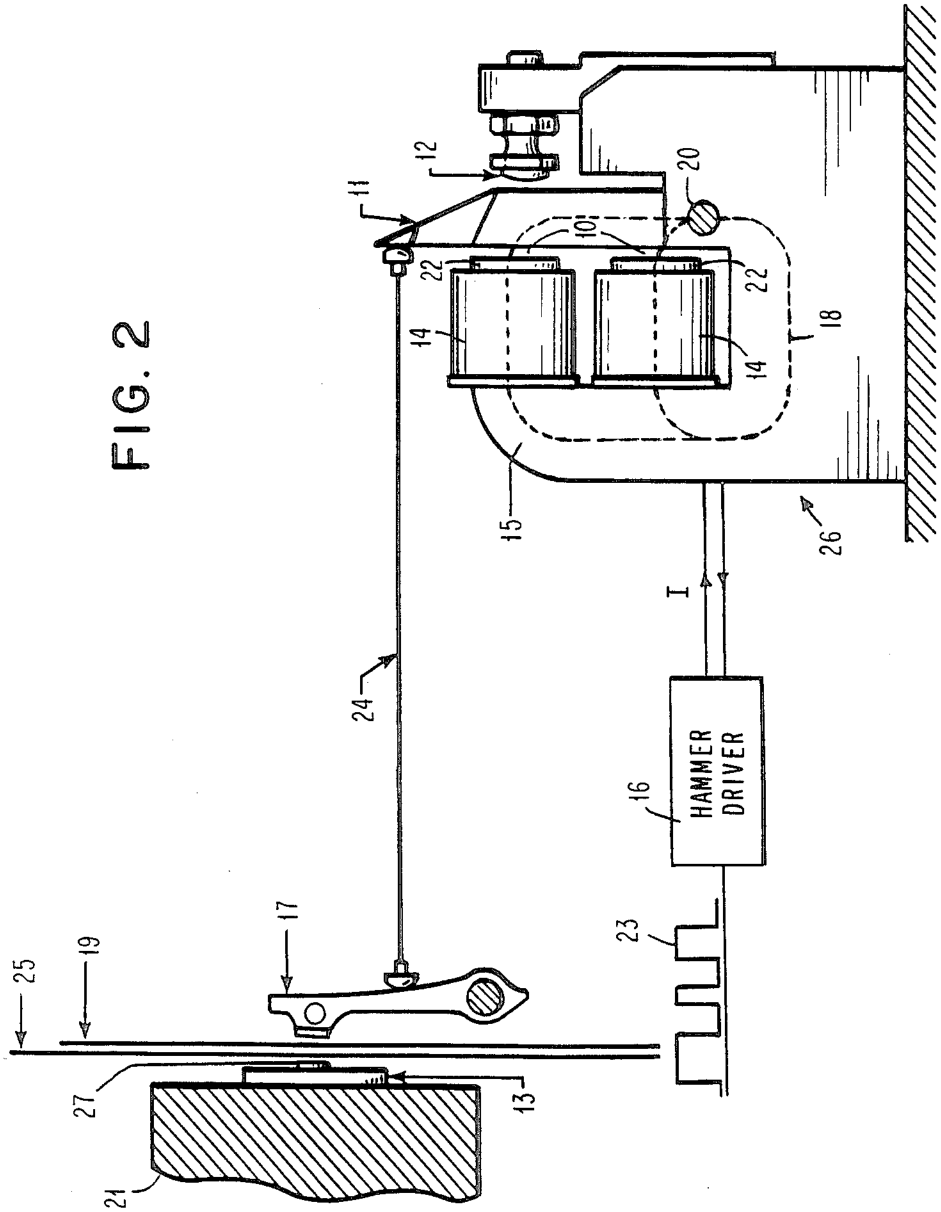
FIG. 2 is a diagram of a typical print actuator which may be used according to the invention.

Electromagnetic actuator 1 of FIG. 1 is illustrated in FIG. 2, and is similar to that described in U.S. Pat. No. 4,440,079, granted to Douglas A. Dayger et al. on Apr. 3, 1984. The actuator is suitable for a single print position of a high-speed, engraved band line printer of a type well known in the art.

The actuator includes a stator assembly 26 consisting of coils 14 on poles 22 of stationary magnetic core 15. In the rest position, hammer 17 and armature 11 are spring-loaded clockwise, so that the armature rests on backstop 12, push-rod 24 rests on the armature, and hammer 17 rests on the push-rod. When energized by pulse train 23 delivered to driver circuit 16, coils 14 generate magnetic flux $\phi$ in magnetic circuit 18, consisting of armature 11, magnetic core 15 and air gaps 10. The magnetic flux causes armature 11 to rotate counterclockwise about pivot 20, overcoming the force of the return springs. This motion is coupled to hammer 17 by means of push-rod 24. Armature 11, push-rod 24 and hammer 17 move in unison on the forward stroke until armature 11 strikes poles 22, after which push-rod 24 and hammer 17 continue ballistically until impact. During impact, paper 19 and ribbon 25 are forced again type-face 27 of the moving print band 13 which is backed by stationary platen 21. After impact, hammer 17 and push-rod 24 rebound from paper 19, collide with armature 11, thereby urging it to return to backstop 12. Upon reaching the backstop, armature 11, push-rod 24, and hammer 17 continue to bounce in the vicinity of the rest position until settle-out is achieved.

It should be emphasized that this actuator is merely representative of the type used in impact printers, and that other types, such as those used for wire matrix printing, may also benefit from the control scheme disclosed herein.

Description of the Hammer Driver

Figure 3:
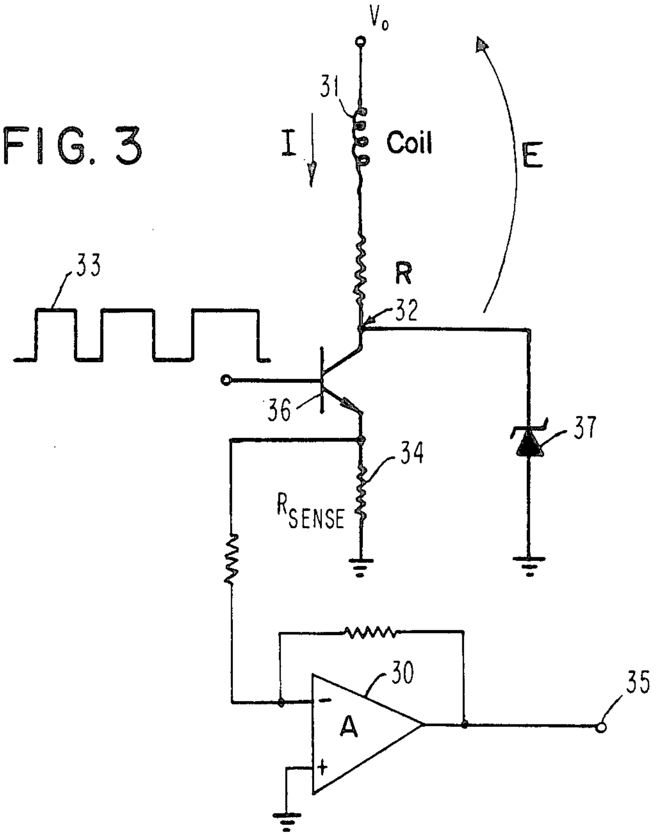
FIG. 3 is a schematic diagram of a typical driver circuit which may be used according to the invention, including a means for measuring current.

Hammer driver 9 of FIG. 1 is illustrated in FIG. 3. Coil 31, composed on N turns, corresponds to item 14 on FIG. 2. Resistance R is typically on the order of 10 Ω, but in general may be selected to produce the desired saturation current according to $I_{sat}=V_O/R_{total}$, where $R_{total}$ is the total resistance of the circuit, including resistor $R_{sense}$ and the resistance of the coil. The supply voltage $V_O$, typically on the order of 50 volts, is nominally constant, but in practice may vary as a function of load, for example if many actuators in the printer are fired simultaneously. This variation is one of the perturbations to be counteracted by feedback control. Pulse train 33, the control input to the hammer driver, corresponds to pulse train 8 in FIG. 1. It is applied to the base of transistor 36 for purpose of switching the current I on and off. Zener diode 37 is used to protect transistor 36 whenever the current is switched off (i.e. on the falling edges of pulse train 33) by preventing the voltage at point 32 from becoming too large. The reverse breakdown voltage of zener diode 37 should be larger than the supply voltage $V_O$. Resistor 34, amplifier 30, and output voltage 35 are explained subsequently in connection with the measurement of current.

Description of the A/D Converter, Microprocessor, and Timer

In a prototype embodiment, A/D converter 3 in FIG. 1 is an Intech DAS-5712, as configured on a Tecmar Labmaster® Card, microprocessor 4 in FIG. 1 is an Intel 80286, as configured in an IBM Personal Computer AT, and programmable timer 7 in FIG. 1 is an Advanced Micro Devices 9513, as configured on the Tecmar Labmaster® card. In this embodiment, A/D triggering and timer programming needed to produce the pulse-width-modulated waveform are accomplished under the control of software written in 80286 assembly language, in which the load registers of the programmable timer are reloaded on-the-fly with values calculated under feedback control.

In a preferred embodiment, the microprocessor, A/D converter, and programmable timer are integrated in a single device, such as an Intel 8096 micro-controller, which is far less costly than the prototype system, and which also incorporates more convenient means of producing pulse-width-modulated waveforms of the type required by this invention.

In a printer which uses a plurality of actuators, it may be impractical to devote an entire microprocessor of microcontroller to each. However, multiplexing of the processor amongst several actuators is possible, since in many printers, such as band-type line printers, only one actuator out of many is active at any given time.

Theoretical Foundations of the Control Scheme

The control scheme disclosed in this invention is founded on a mathematical model, which predicts that during the actuator's forward stroke, its mechanical, electrical, and magnetic behavior may be described approximately by the following equations:

$$\text{Mechanical: } mx = F_{mag}(\phi) + F_{back}(x,x) + F_{spring}(x) \quad (1a)$$

$$\text{Electrical: } N\phi + IR_{total} = E[V_{zener}, V_0, u(t)] \quad (1b)$$

$$\text{Magnetic } \mathcal{R}(x,\phi)\phi = NI \quad (1c)$$

with nominal initial conditions:

$$x(O)=O,\ \dot{x}(O)=O,\ \phi(O)=O. \quad (2)$$

Equation (1*a*) is Newton's law for the combined equivalent mass m of armature 11, push-rod 24, and hammer 17 of FIG. 2, which move in unison on the forward stroke. Equation (1*b*) is a statement of Ohm's Law and Faraday's Law. Equation (1*c*) is the magnetic-circuit equation for magnetc circuit 18 of FIG. 2. In these equations, x(t) is the forward displacement of the hammer face; a "dot" represents differentiation with respect to time t; $\phi(t)$ is the magnetic flux flowing in magnetic circuit 18; $\mathcal{R}$ is the total reluctance of the magnetic circuit; $F_{mag}$, $F_{back}$, and $F_{spring}$ represent, respectively, the magnetic force, the backstop force and the spring force exerted on the armature; N is the number of turns on the coil; I is the current in the coil; $R_{total}$ is the sum of resistances R and $R_{sense}$ in FIG. 3 plus the resistance of the coil; and E is the voltage indicated in FIG. 3, which may be calculated as a function of the zener characteristic, the supply voltage $V_O$, and the control input u(t).

Four nonlinearities exist in eqs. (1). First, the magnetic force $F_{mag}$ is roughly proportional to the square of the flux $\phi$, which implies that the force is always directed in the direction of positive x. Second, the backstop force is zero for $x>0$, but increases rapidly, as a function of both x and x, for $x<0$. Third, the voltage E depends nonlinearly on current I because the zener characteristic depends on I. Fourth, the circuit reluctance $\mathcal{R}$ depends nonlinearly on x because the reluctance of air gaps 10 of FIG. 2 depends on x. Reluctance $\mathcal{R}$ also depends nonlinearly on $\phi$ because armature 11 and core 15 of FIG. 2 are typically composed of materials exhibiting nonlinear magnetic properties (e.g. saturation).

The foregoing nonlinearities rule out analytic derivation of a control law. Nevertheless, the theory is useful to identify the state variables which need to be measured in practice to define the system completely at any instant in time. Eqs. (1*a*) and (1*b*) indicate that the system is third order, with state variables x, $\dot{x}$ and $\phi$ (position, velocity, and flux). However, current I may be substituted for flux $\phi$ as a state variable, because eq. (1*c*) is an algebraic relation from which $\phi$ may be deduced given x and I. This substitution is advantageous in practice because current I is easier to measure than flux $\phi$. Hence the instantaneous state of the system is completely defined by the three variables x, $\dot{x}$, I (position, velocity, and current): if these variables are measured at some time t*, then apart from perturbations occurring after t*, the future behavior of the system is completely known, independent of the particular history which produced the measured state at t*.

In practice, perturbations occur throughout the hammer's trajectory. Although settle-out and wear may perturb initial conditions only, the effects of interaction, voltage fluctuations, and variations in friction typically persist through the stroke. Therefore, accurate control of the actuator shown in FIG. 2 requires several measurements of the state during the trajectory, and a control decision after each measurement. The following sections specify the means for measuring the state variables and the means for implementing the control algorithm.

MEASURING THE STATE VARIABLES

A "state variable" in control theory is a variable whose time derivative appears in the mathematical statement of the problem.

Measuring Current

Current is measured as shown in FIG. 3: a small resistor 34 (e.g. 0.1 Ω) is connected as shown, and the voltage across it is amplified by amplifier 30. Consequently, output voltage at node 35 is directly proportional to coil current I during the times that transistor 36 is switched on. This suffices for the control algorithm described herein, since the algorithm requires that current be measured only when the control input is on.

Measuring Displacement

Figure 4:
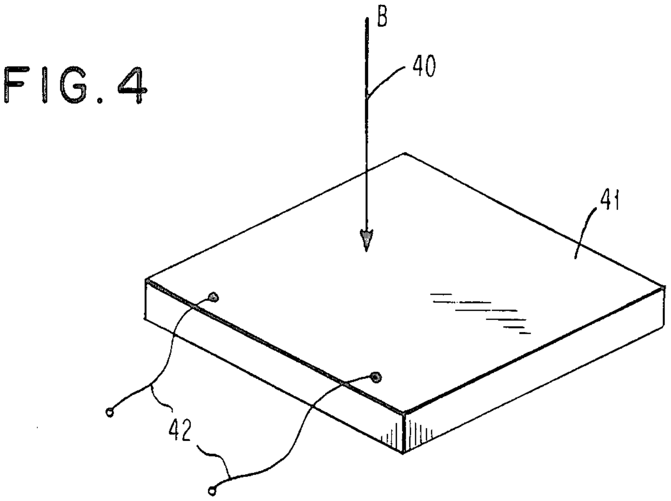
FIG. 4 is a sketch of a magnetoresistive device for measuring displacement.

Displacement of the hammer is measured in the preferred embodiment by a magnetoresistive device, such as that manufactured by Siemens Corporation. As shown in FIG. 4, a magnetoresistor is a planar device in which the electrical resistance between terminals 42 is an increasing function of the local magnetic field 40 applied perpendicular to the active surface 41.

Figure 5:
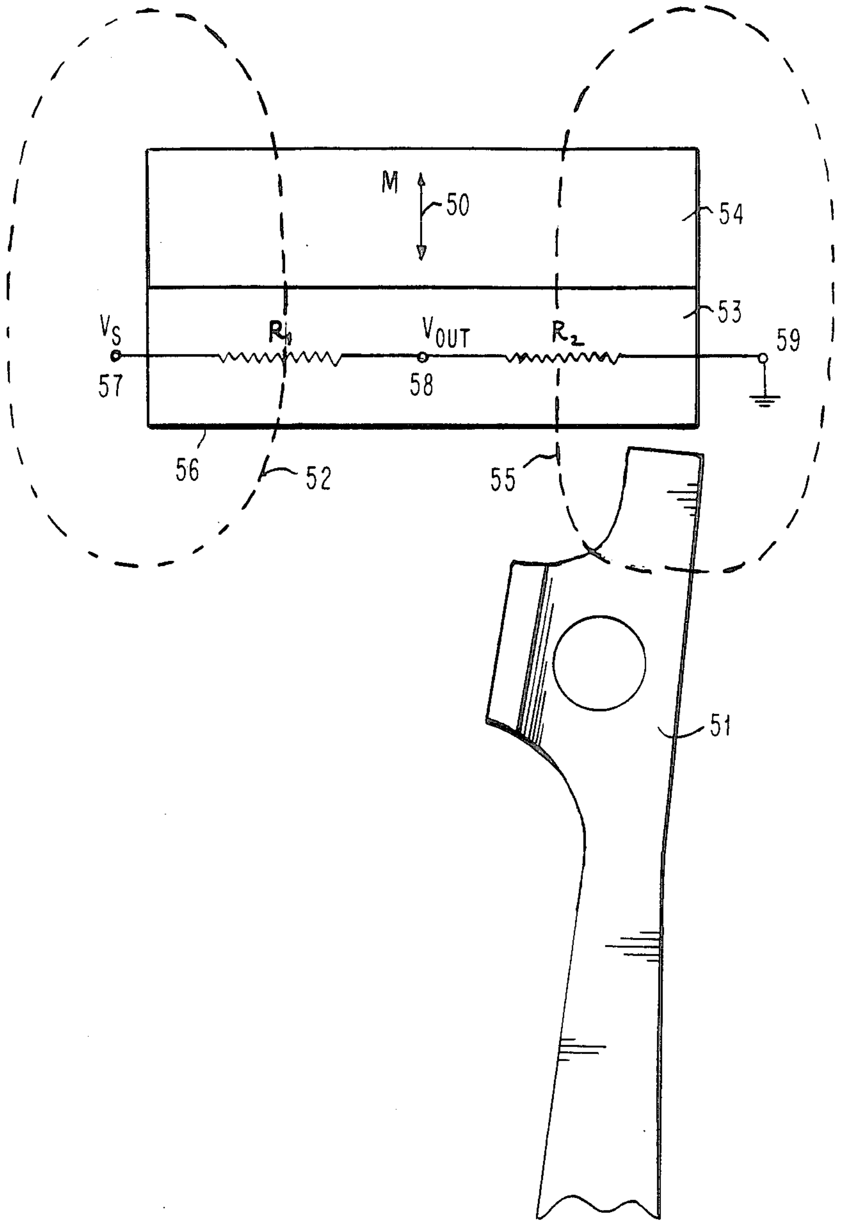
FIG. 5 is a schematic representation of a magnetoresistive sensor incorporating two magnetoresistors, indicating a means for measuring the displacement of the hammer shown in FIG. 2.

As shown in FIG. 5, off-the-shelf sensors are available which incorporate two resistors $R_1$ and $R_2$, nominally of equal resistance, fabricated on a single device 53 with active surface 56. The magnetoresistive sensor 53 is used as a voltage divider: a constant supply voltage $V_s$ is applied to terminal 57, terminal 59 is grounded, and the output voltage $V_{out}$ is measured at terminal 58. Magnetoresistor 53 is laminated to permanent magnet 54, which is poled as shown by arrow 50. In the absence of nearby ferromagnetic material, such as manner 51, the nominal output voltage $V_{out}$ is equal to one-half of the supply voltage $V_s$, because the magnetic flux produced by the permanent magnet 54 is symmetrically disposed about the center of the magnetoresistor 53, whence the two resistors $R_1$ and $R_2$ have equal resistance. However, in the presence of nearby ferromagnetic material, such as hammer 51, the distribution of magnetic flux is asymmetric about the center of the sensor 53. In particular, if the hammer is displaced to the right of center, as shown in FIG. 5, then the reluctance of flux paths to the right, such as 55, will be lower than their counterparts to the left, such as 52, thus causing more magnetic flux to flow to the right than to the left. Consequently resistor $R_2$, immersed in a larger magnetic field, will have a higher resistance than resistor $R_1$, and output voltage $V_{out}$ will be greater than one-half of the supply voltage $V_s$. Conversely, if the hammer is displaced to the left, then the output voltage $V_{out}$ will be less than one-half of the supply voltage $V_s$. Thus the instantaneous position of the hammer 51 may be deduced from the instantaneous vaue of output voltage $V_{out}$.

Figure 6A:
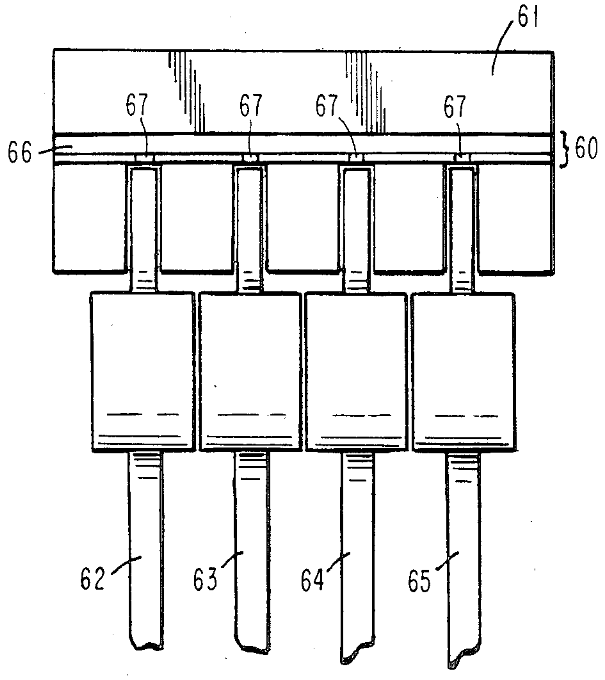
FIG. 6 illustrates in two views (FIG. 6A a schematic partial front view and FIG. 6B a schematic partial side view) means of incorporating an array of magnetoresistive sensors in a printer which uses a plurality of actuators of the type shown in FIG. 2.
Figure 6B:
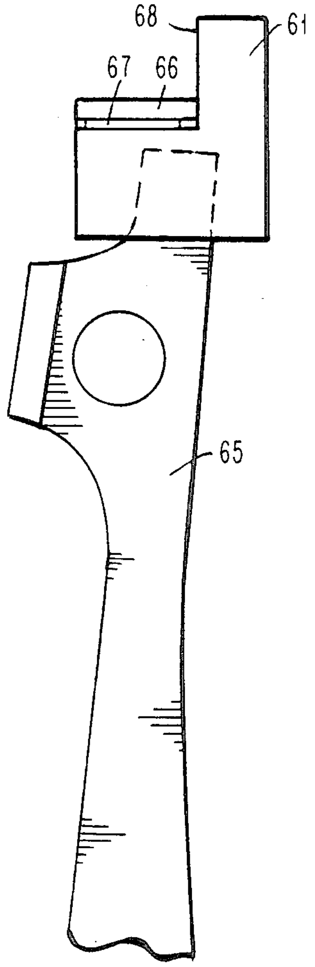

FIG. 6 illustrates the means of incorporating the foregoing magnetoresistive sensor in a printer of the type which uses a plurality of actuators such as that shown in FIG. 2. In FIG. 6, several hammers 62, 63, 64, 65 are shown, each of which corresponds to item 17 of FIG. 2, as viewed from the left end of FIG. 2. The side view given in FIG. 6 clarifies the relationship to FIG. 2. The sintered-bronze guide block 61 shown in FIG. 6 is typically used in prior-art printers to restrain the hammers from rocking sideways about an axis perpendicular to the plane of the Figure. In accordance with the present invention, this guide block 61 also serves as the mounting plate for an integrated array 60 of magnetoresistive sensors 67 mounted on a common permanent magnet 66. Machined surface 68 of guide block 61 may be used to locate the integrated array 60 with respect to the rest position of the hammers.

Measuring Velocity

The instantaneous velocity $v \equiv \dot{x}$ of the hammer may be approximated by measuring the displacement x twice in quick succession and dividing the difference by the time which elapses between the two measurements.

THE CONTROL ALGORITHM

General Description

Figure 7:
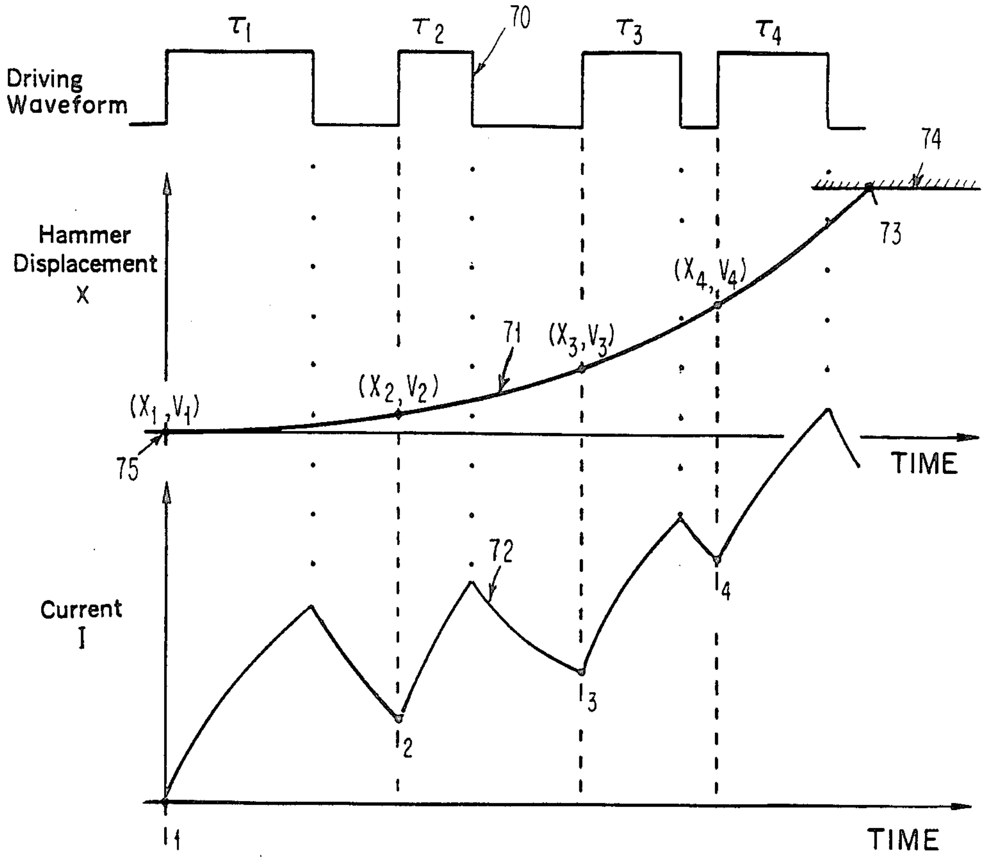
FIG. 7 illustrates the format of the pulse-width-modulating control algorithm to be used according to this invention.

The control scheme disclosed in the preferred embodiment is a pulse-width-modulating algorithm of the type illustrated in FIG. 7. Control input 70 corresponds to waveform 33 injected into the base of transistor 36 of FIG. 3, and also corresponds to item 8 on FIG. 1. A typical hammer trajectory x(t) is shown as curve 71 and a typical current waveform I(t) is shown as curve 72. Time $t=0$ is defined to be coincident with the rising edge of the first pulse $\tau_1$, which initiates the actuation cycle. Subsequent pulses are applied while the armature is in mid-flight, so that the entire pulse train is completed during the armature's forward stroke, prior to impact 73 at platen 74.

In the preferred embodiment of the invention, the rising edges of the pulses in waveform 70 occur at fixed times with respect to $t=0$, times which must be selected a priori by the control-system designer. The falling edges of the pulses occur at times which are determined automatically by the feedback algorithm in order to achieve the control objectives. Thus the feedback scheme controls the duty cycle of each pulse, but not the spacing of the pulses; that is, it controls the horizontal positions of the dotted lines, but not the dashed lines, on FIG. 7. More specifically, the control scheme decides where the falling edge of each pulse should occur based on a sample of the state variables—hammer position, hammer velocity, and coil current—measured at the beginning of the pulse. For example, in FIG. 7, pulse width $\tau_1$ is chosen as a function of $(x_1, v_1, I_1)$, the position, velocity, and current at the beginning of pulse 1; pulse width $\tau_2$ is chosen as a function of $(x_2, v_2, I_2)$; and so on. Means for selecting the appropriate timing will be given subsequently.

In FIG. 7, four pulses are shown driving the hammer from its rest position 75 to the point of impact 73. In general, the number of pulses N is arbitrary: a greater or lesser number may be desirable to accomplish best the control objectives for a given actuator. In any case, according to the invention, the number of pulses, once selected, is fixed: it is not altered by feedback control. Theoretically, a train of just two pulses would suffice to achieve simultaneous regulation of flight time and impact velocity, since two independent control decisions (i.e. the widths of the two pulses) would then be available to achieve the two independent objectives. However in practice, since perturbations occur throughout the trajectory, in particular after one or both control decisions have been made, and furthermore since the measurement of the state variables is not absolutely accurate, it is generally preferable to incorporate more than two pulses in the pulse train. In fact, to achieve the best control, it would be preferable to include as many pulses (and hence as many control decisions) as possible. However, there are practical limits which impose an upper limit on the number of possible pulses, as discussed subsequently in connection with FIG. 9.

Figure 8:
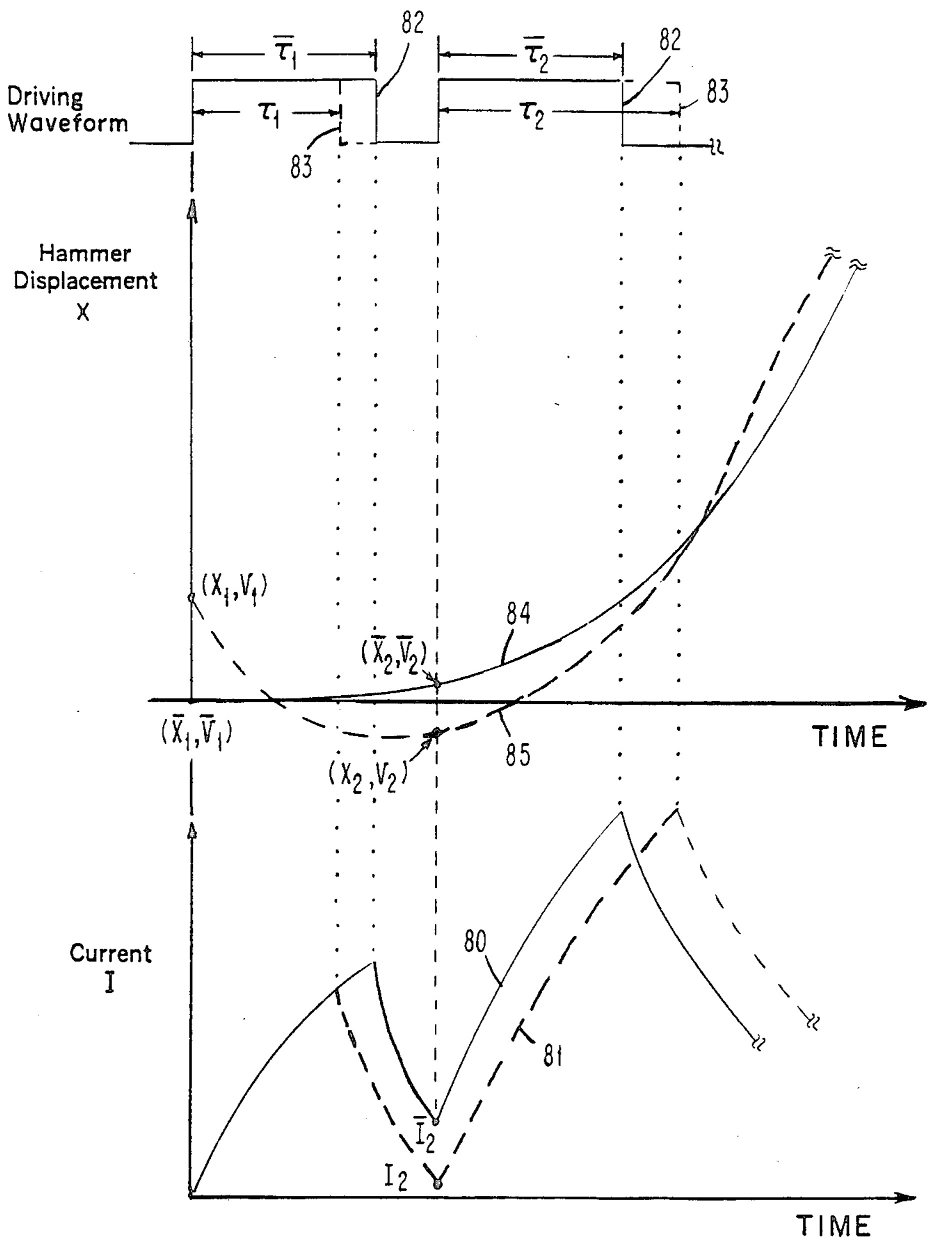
FIG. 8 also illustrates the format of the pulse-width-modulating control algorithm, indicating that all measurements and pulse widths are referenced to nominal values.

As shown in FIG. 8, the control algorithm references all quantities to nominal values: there is an ideal trajectory of the system, $\bar{x}(t)$, $\bar{v}(t)$, $\bar{I}(t)$, denoted by solid lines 84 and 80, which occurs in the absence of perturbations when the actuator is driven by a nominal sequence of pulse widths $\tau_i (i=1, \ldots, N)$, as denoted by solid line 82. In the presence of perturbations, the perturbed trajectory x(t), v(t), I(t), denoted by dashed lines 85 and 81, will in general not coincide with the ideal trajectory. To compensate for these perturbations, the widths of the pulses in the driving waveform may be individually modulated, as shown by the dashed lines 83, so that the errant trajectory 85 converges to the ideal trajectory 84. For the case shown in FIG. 8, the width of pulse $i=1$ is reduced from its nominal value $(\tau_1<\tau_1)$, while the width of pulse $i=2$ is increased $(\tau_2>\tau_2)$. In general, the pulse-width modulation of pulse i, defined as the difference between the actual, applied pulse width $\tau_i$ and the corresponding nominal value $\tau_i$, and hereafter denoted $PWM_i$, is a function of the state-variable errors $(ex_i, ev_i, eI_i)$, where these errors are defined as the differences between the actual, measured values of the state variables $(x_i, v_i, I_i)$ and the corresponding nominal values $(\bar{x}_i, \bar{v}_i, \bar{I}_i)$. Mathematically this may be expressed as $$PWM_i \equiv \tau_i - \tau_i = f_i(ex_i, ev_i, eI_i), \quad (3a)$$

where $i=1, \ldots, N$, and $$\begin{aligned} ex_i &\equiv x_i - x_i \\ ev_i &\equiv v_i - v_i \\ eI_i &\equiv I_i - I_i. \end{aligned} \quad (3b)$$

The control functions $f_i$ will in general be different for each i. Moreover, in a printer consisting of a plurality of actuators, the control functions $f_i$ may be somewhat different for each actuator, on account of manufacturing variations. Systematic means for determining the control functions $f_i$ will be described in the section entitled "Derivation of the Control Functions $f_i$."

Determining the Nominal Trajectory

The nominal values of the state variables $(\bar{x}_i, \bar{v}_i, \bar{I}_i)$ must be obtained before the control algorithm can be applied during printing. These nominal values may be obtained readily by calibration; that is, by energizing the actuator a number of times with the nominal waveform, in the absence of perturbations, and then by averaging the results obtained over the several shots. The averaged results $(\bar{x}_i, \bar{v}_i, \bar{I}_i)$ are stored for later use in data memory 6 of FIG. 1. In principle, this calibration procedure need be performed only once, when the printer is manufactured. In practice, periodic recalibration may be desirable.

During the calibration procedure, to simulate the absence of perturbations, each hammer in the printer is fired alone, with all other hammers at rest, in order to remove perturbations caused by interaction and to eliminate load variations of the supply voltage $V_O$. Moreover, during this calibration procedure, the hammers are fired at a low repetition rate, in order to remove perturbations caused by settle-out. Other variations, such as those caused by friction, are eliminated by the averaging procedure.

Details of Each Pulse

Figure 9:
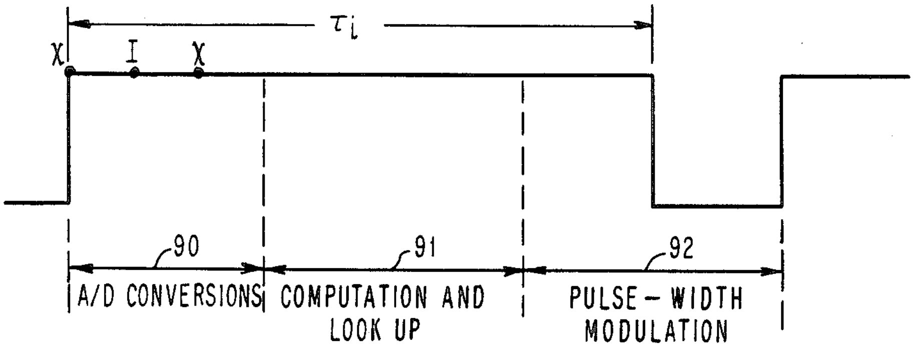
FIG. 9 illustrates the sequence of events which take place during each pulse of the pulse width modulated waveform.

To implement the control algorithm indicated in FIG. 7 and FIG. 8 in the context of the feedback loop shown in FIG. 1, the microprocessor 4 (FIG. 1) executes, for each pulse i in pulse train 70 of FIG. 7, the sequence of events shown in FIG. 9. First, during interval 90 of the pulse, the state of the hammer is measured by an analog-to-digital converter. As indicated on FIG. 9, three conversions are performed in sequence, including two conversions of hammer displacement x and one conversion of coil current I. Velocity v is estimated from the two x-measurements, as explained earlier. (The x-measurements are taken first and last to maximize the difference between the two x-measurements, thereby to minimize the sensitivity of the velocity estimate to noise, and to minimize truncation error caused by limited precision of the A/D converter). Next, during interval 91, the state-variable errors are calculated by the microprocessor, according to eqs. (3b), and the control function for pulse i, denoted $f_i$ in eq. (3a), is evaluated by computation or by table lookup, as explained subsequently. Finally, interval 92 is reserved for the pulse-width modulation itself: the falling edge of the pulse may occur at any time during this interval, depending on the value of $PWM_i$ calculated during interval 91.

According to the above description, pulse width $\tau_i$ can never be shorter than the sum of interval 90 plus interval 91. The nominal pulse width $\tau_i$ will in general be somewhat longer than this minimum, in order to allow for negative pulse-width modulations (i.e. $\tau_i < \tau_i$). Thus the speed of A/D conversion and the speed of computation limit the minimum nominal width of each pulse, and therefore limit the maximum number of pulses which can be accommodated within a hammer trajectory of given duration.

DERIVATION OF THE CONTROL FUNCTIONS $f_i$

Summary of the Method

Implementation of the foregoing control algorithm depends crucially and entirely on a means of deriving, prior to operation of the actuator, the control functions $f_i$ in eq. (3a). The means given here involve a computer-controlled, trial-and-error procedure to obtain data describing each of the funcions $f_i$ at a number of points in the three-dimensional space of errors ($ex_i$, $ev_i$, $eI_i$), followed by mathematical interpolation/extrapolation of the data, via statistical regression, so that $f_i$ is well defined for every combination of errors ($ex_i$, $ev_i$, $eI_i$).

The computer-controlled, trial-and-error procedure is summarized by the following "pseudocode:"

```
For i = 1 to N                                          (4)
{
    For perturbation = . . . to . . .
    {
        For PWM_i = PWM. min to PWM. max
        {
            Fire the actuator; measure(ex_i, ev_i, eI_i)
            Evaluate acceptance criterion
            If satisfied, save (ex_i, ev_i, eI_i, PWM_i)
        }
    }
}
```

The outermost of this trial-and-error procedure is a loop on the pulse index i. The first time through the loop, with i=1, the objective of the procedure is to determine how best to modulate the width of the first pulse in the pulse train, based on the measurements at the beginning of the pulse, to accomplish the required regulation of flight time and/or impact velocity. The second time through the loop, with i=2, the objective is likewise to determine how best to modulate the width of pulse 2. And so on.

The middle loop of the trial-and-error procedure (4) is a loop on perturbations, which are generated deliberately to produce various combinations of the three state-variable errors ($ex_i$, $ev_i$, $eI_i$). Means of generating such perturbations are discussed subsequently.

In the inner loop of the trial-and-error procedure (4), the pulse-width modulation of pulse i is varied within certain limits, as described in the foregoing (see "Details of Each Pulse"), where $PWM.min_i$ is typically less than zero, and $PWM.max_i$ is typically greater than zero. For each value of $PWM_i$, the actuator is fired, and the state-variable errors ($ex_i$, $ev_i$, $eI_i$) at the beginning of pulse i are measured. The remainder of the trajectory, driven by nominal pulse widths for pulses i+1, . . . , N, is also monitored, and some pre-defined "acceptance criterion," discussed subsequently, is evaluated to determine if this particular value of $PWM_i$ successfully counteracts the given combination of errors ($ex_i$, $ev_i$, $eI_i$). If the acceptance criterion is satisfied, then the combination of four numbers ($ex_i$, $ev_i$, $eI_i$, $PWM_i$) is saved in a list (using data memory 6 of FIG. 1), for the purpose of associating this particular value of $PWM_i$ with this particular combination of errors.

Consequently, when the trial-and-error procedure is completed, a list of the successful combinations ($ex_i$, $ev_i$, $eI_i$, $PWM_i$) will have been compiled for each i, and analytic approximations to the functions $f_i$ may then be generated from this data using linear regression. A typical regression model, written in standard matrix/vector notation, might be $$PWM_i = f_i(ex_i, ev_i, eI_i) = a_i \cdot e_i + e_i^T [B_i] e_i, \qquad (5)$$

where $e_i$ is the vector of errors ($ex_i$, $ev_i$, $eI_i$), superscript T denotes transpose, and $a_i$ and $[B_i]$ are respectively a vector and a 3×3 matrix of regression constants to be determined by the regression procedure. The regression model represented by eq. (5) includes 3 terms which are linear in the measured errors ($ex_i$, $ev_i$, $eI_i$), and 6 terms which are quadratic ($ex_i^2$, $ev_i^2$, $eI_i^2$, $ex_i ev_i$, $ex_i eI_i$, $ev_i eI_i$). Simpler or more complicated regression models may be appropriate in some cases. For example, in the prototype embodiment, the quadratic regression model (5) is inadequate to describe the control function $f_1$, on account of strong nonlinearities associated with rebound from the backstop (see the discussion accompanying FIG. 17). Consequently, 10 cubic terms ($ex_i^3$, $ev_i^3$, $eI_i^3$, $ex_i^2 ev_i$, $ex_i^2 eI_i$, etc.) were added to the model for i=1. In other cases, it may be appropriate to fit the data piecewise, using a separate regression for various regions of the error space ($ex_i$, $ev_i$, $eI_i$), rather than trying to fit the whole space with a single set of regression constants. For example, in the prototype embodiment, the quadratic regression model (5) is used for i=2, 3, 4, but each of the error spaces is divided into slabs along the $eI_i$ axis, and a separate quadratic is fit to the data in each slab.

Figure 10:
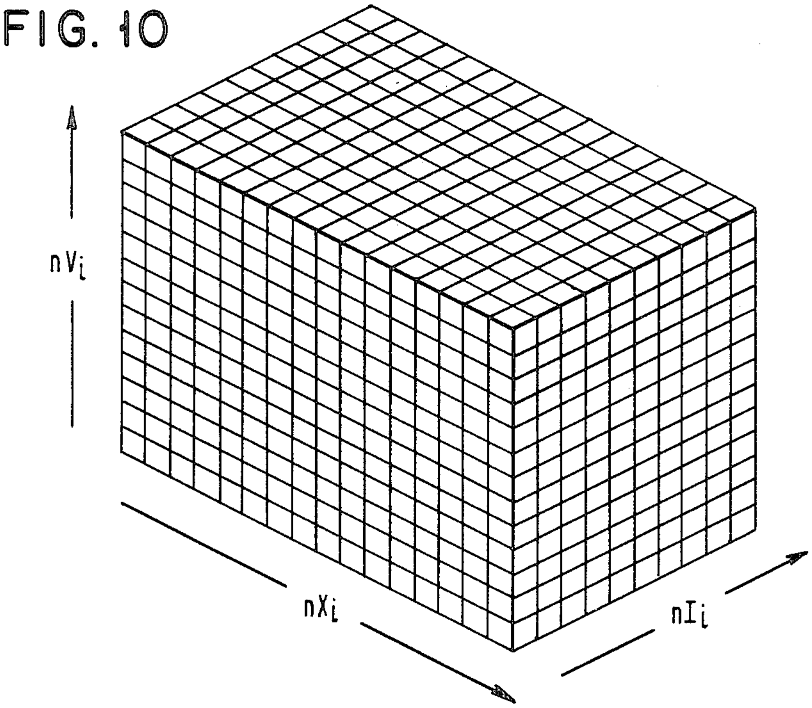
FIG. 10 is a conceptual sketch showing the structure of a three-dimensional look-up table.

Once the regression constants $a_i$ and $B_i$ have been determined, the right-hand side of eq. (5) specifies the control function $f_i$ to be applied during closed-loop operation of the actuator. These functions may be applied in one or two ways, depending on the characteristics of microprocessor 4 in FIG. 1. If the microprocessor is fast enough to calculate the control functions $f_i$ without impeding the effectiveness of the control scheme (see "Details of Each Pulse" above), then direct, on-the-fly calculation of $f_i$ is desirable because it is easiest to implement and requires little data memory (only enough to hold the regression constants). However, if the microprocessor is not fast enough to calculate the control functions $f_i$ without impeding the effectiveness of the control scheme, then it is desirable to avoid on-the-fly calculation, and instead to generate, prior to operation of the actuator, three-dimensional look-up tables to represent the right-hand side of equation (5), as illustrated in FIG. 10. In this diagram, each cubic element of the table holds a number representing pulse-width modulation in μs, and in general these values vary smoothly throughout the table. In general, there will be a separate table for each pulse i. For each table, the indices ($nx_i$, $nv_i$, $nI_i$) along the axes shown in FIG. 10 are related to the state-variable errors by linear transformations $$\begin{aligned} nx_i &\equiv cx_i ex_i + kx_i \\ nv_i &\equiv cv_i ev_i + kv_i \\ nI_i &\equiv cI_i eI_i + kI_i, \end{aligned} \qquad (6)$$

where the constants ($cx_i$, $cv_i$, $cI_i$) are selected to scale the observed range of errors ($ex_i$, $ev_i$, $eI_i$) into a look-up table of given dimensions, while the constants ($kx_i$, $kv_i$, $kI_i$) are selected to position the the ideal case, ($ex_i$, $ev_i$, $eI_i$)=(0, 0, 0), near the center of the table.

Means of Generating Perturbations

In the trial-and-error procedure described above, means of perturbing the hammer trajectory are needed to produce various combinations of errors ($ex_i$, $ev_i$, $eI_i$). Several perturbation schemes may be used.

Figure 11:
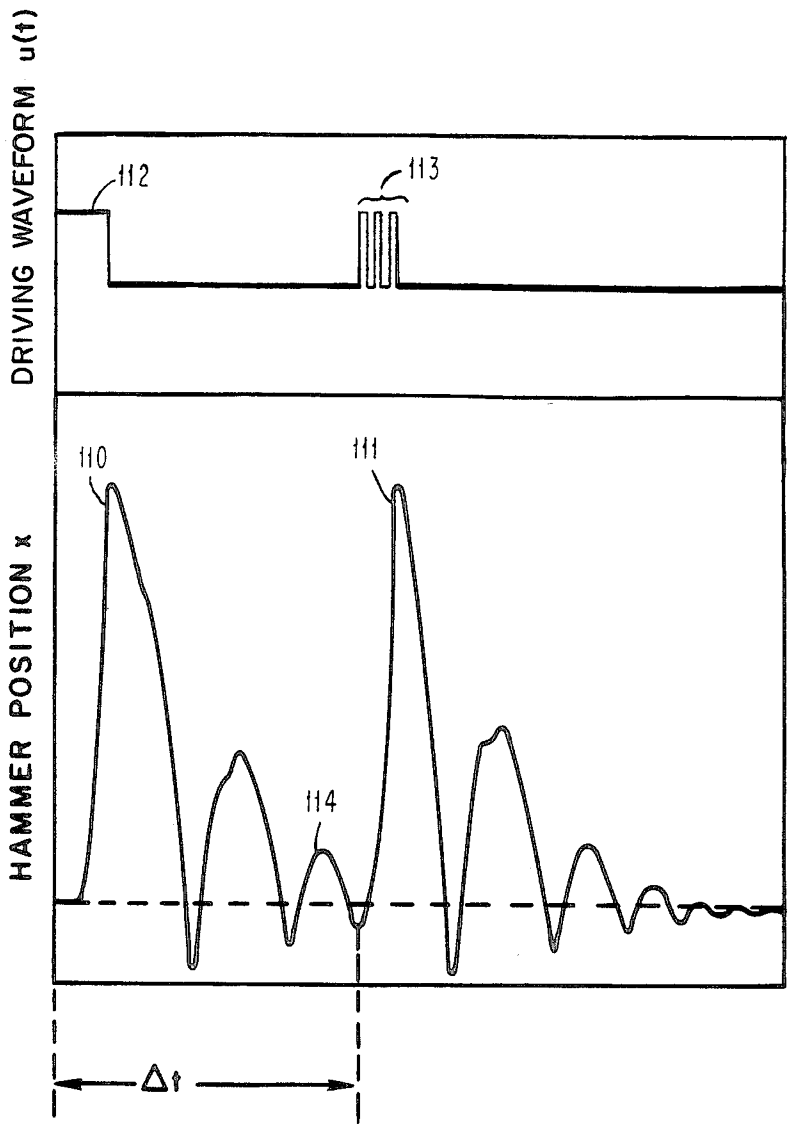
FIG. 11 illustrates one means of generating perturbations during derivation of the control functions.

The first scheme, illustrated in FIG. 11, exploits the phenomenon of settle-out to perturb position and velocity. The actuator is fired twice in quick succession. The second actuation 111, driven by pulse-width-modulated waveform 113, is perturbed by the settle-out characteristic 114 of the first actuation 110. The trial-and-error procedure is applied to the second actuation 111, while actuation 110, which may be driven by a simple pulse 112 of arbitary width, exists merely to produce non-zero values of ($ex_i$, $ev_i$) for actuation 111. Different combinations of ($ex_i$, $ev_i$) may be produced by varying the delay $\Delta t$ between the two actuations. For example, when $\Delta t$ is large, actuation 110 settles out before actuation 111 is fired, whence actuation 111 is unperturbed and ($ex_i$, $ev_i$)$\simeq$(0, 0). However, as $\Delta t$ is made gradually smaller, actuation 111 intrudes further and further upon settle-out characteristic 114. Thus as $\Delta t$ decreases, the initial conditions x(0) and v(0) for actuation 111, and hence the entire trajectory, are perturbed to a greater and greater extent.

The foregoing scheme to perturb the hammer trajectory does not appreciably perturb current I, so an additional means is needed to produce nonzero values of $eI_i$. For $i>1$ the required perturbation may be accomplished simply by modulating the width of pulse $i-1$. For $i=1$ perturbation of current is unnecessary, since in operation I(0) is not appreciably perturbed.

Means of Defining the Acceptance Criteria

In the trial-and-error procedure described above, the pulse-width modulation $PWM_i$ is deemed to do a good job of counteracting errors ($ex_i$, $ev_i$, $eI_i$) if a pre-defined "acceptance criterion" is satisfied. To define the acceptance criteria for the various pulses, either of two approaches may be adopted.

The first approach is simply to accept a value of pulse-width modulation $PWM_i$ if, given errors ($ex_i$, $ev_i$, $eI_i$) at the beginning of pulse i, it achieves the ultimate control objectives—e.g. the required regulation of flight time and impact velocity—all on its own, with subsequent pulse widths $\tau_i+1, \ldots, \tau_N$ held fixed at their nominal values. This approach is uncooperative, in the sense that each pulse is asked to accomplish the whole job, assuming no assistance—no pulse-width modulation—from the other pulses. Consequently, the control functions $f_i$ derived in this way may produce results which are less favorable than those produced by a cooperative approach which recognizes that in closed-loop operation, all the pulses are modulated in tandem. Thus, while this first approach is simple to implement, its effectiveness is not assured. Indeed, if simultaneous regulation of flight time and impact velocity is required, this approach may fail altogether, since in general it is impossible for the modulation of a single pulse to achieve two independent objectives.

If the first approach fails to work, a second approach, a cooperative one, may be applied. It is more difficult to implement, but its effectiveness is more certain; in particular, it will work where flight time and impact velocity need to be regulated simultaneously. In this approach, pulse-width modulation $PWM_i$ is accepted if it manages to steer the trajectory so that, at the beginning of the next pulse (measurement point $i+1$), the state-variable errors are within some defined tolerances. If those tolerances are defined tighter and tighter for each successive value of i, the effect is to force convergence of the trajectory to the ideal, reference trajectory.

Graphical illustration of this idea is difficult for the third-order electromagnetic actuator described according to eqs. (1) by the state variables x(t), v(t), and I(t). Instead, the idea is illustrated in FIG. 12 for a simple, artificial, first-order system described by a fictitious state variable z. In FIG. 12, solid curve 120 represents the ideal trajectory $\bar{z}(t)$, dashed curve 121 represents a perturbed trajectory z(t), and pulse train u(t) represents the driving waveform. Vertical bar $\Delta z_1$ represents the expected range of initial errors $ez_1$. Vertical bars $\Delta z_2$, $\Delta z_3$, $\Delta z_4$, and $\Delta z_5$ represent pre-defined tolerance windows which specify the acceptance criteria for the various pulses. For example, in the trial-and-error procedure for the first pulse train u(t), a particular value of $\tau_1$ is accepted if, starting with error $ez_1$ within tolerance window $\Delta z_1$, it manages to steer the perturbed trajectory z(t) through tolerance window $\Delta z_2$, which is somewhat smaller than $\Delta z_1$. Likewise, a particular value of $\tau_2$ is accepted if, starting with error $ez_2$ within tolerance window $\Delta z_2$, it manages to steer the perturbed trajectory z(t) through tolerance window $\Delta z_3$, which is somewhat smaller than window $\Delta z_2$. And so on. In this way, any trajectory z(t) which starts within the tolerance window $\Delta z_1$ may be forced, under pulse-width control, to converge to the ideal trajectory $\bar{z}(t)$. In particular the final value of the state variable, $z(t_5)$, may be forced to lie within the specified tolerance window $\Delta z_5$.

Applying this same idea to an electromagnetic actuator for impact printing, the values of state variables x(t) and v(t) at the time of impact may be both forced to lie within specified tolerance windows, thus flight time and impact velocity may be simultaneously regulated.

In implementing this scheme, the choice of tolerance windows is important. On the one hand, if a tolerance window is too large, (i.e. if the acceptance criterion for pulse i is too lax), then many values of $PWM_i$ will be accepted by the trial-and-error procedure, there will be little correlation between the state-variable errors ($ex_i$, $ev_i$, $eI_i$) and $PWM_i$, and the regression procedure used to derive the control function $f_i$ will not produce consistent results. On the other hand, if a tolerance window is too tight (i.e. if the acceptance criterion for pulse i is too strict), then no values of $PWM_i$ may be accepted by the trial-and-error procedure, and derivation of the control function $f_i$ by regression, as explained in the foregoing, will be impossible.

Consequently, a systematic means for selecting appropriate tolerance windows is needed, particularly in a third-order system, such as an electromagnetic actuator, where it is necessary to select not simply one-dimensional error bars (as on FIG. 12), but regions in a three-dimensional space. To select these tolerance regions automatically, it is possible to work backwards: instead of starting the trial-and-error procedure with the first pulse $i=1$, it may be started with the last pulse $i=N$, for which the acceptance criterion is well defined a priori in terms of flight time error and impact-velocity errors.

This backward-stepping procedures may be explained by reference to FIG. 12. By analogy to the regulation problem for electomagnetic actuators, the overall objective of the control scheme in FIG. 12 is to regulate the value of $z(t_5)$ within a specified tolerance (analogous to flight time and impact-velocity tolerances). Thus tolerance window $\Delta z_5$ is specified a priori. Applying the trial-and-error procedure to pulse $\tau_4$ determines the combinations of ($ez_4$, $PWM_4$) which steer the trajectory through window $\Delta z_5$. This accomplishes two goals simultaneously. First, the data ($ez_4$, $PWM_4$) may be used to derive the control function $f_4$ by regression, as described previously. Second, the maximum and minimum values of the data $ez_4$ define the window $\Delta z_4$: this is the range of $ez_4$ from which it is possible to reach tolerance window $\Delta z_5$ given the limited available range of pulse-width modulation for pulse $\tau_4$. In other words, the acceptance criterion for pulse $\tau_3$, window $\Delta z_4$, is derived simultaneously with the control function for pulse $\tau_4$.

With an acceptance criterion for pulse $\tau_3$ in hand, it is then possible to apply the trial-and-error procedure to pulse $\tau_3$, thereby to derive the control function for pulse $\tau_3$ and also window $\Delta z_3$, which acts as the acceptance criterion for pulse $\tau_2$. This backward-stepping procedure is continued through all the pulses, until at last the trial-and-error procedure is applied to pulse $\tau_1$, thereby to derive the control function for pulse $\tau_1$ and also window $\Delta z_1$, which specifies the range of initial errors which the control scheme can successfully counteract.

Typical Control Functions for a Prototype Embodiment

To illustrate the above means for deriving the control functions $f_i$, specific results obtained for the prototype embodiment mentioned earlier (see "Description of the A/D converter, Microprocessor, and Timer") are described herein.

In this embodiment, the time required for A/D conversion, interval 90 on FIG. 9, is about 120 μs, while that required for computation, interval 91 on FIG. 9, is about 170 μs. Consequently the pulse train specified in FIG. 13 may be used. Each pulse is "on" for 370 μs, thereby permitting 370−120−170=80 μs of negative pulse-width modulation. As shown in FIG. 13, the intervals between the four pulses are 100 μs, 50 μs, and 50 μs, thereby permitting positive pulse-width modulations of 100, 50 and 50 μs respectively for the first three pulses. Positive modulation of the fourth pulse is effectively limited by the sealing of armature 11 in FIG. 2 against poles 22: the hammer is subsequently ballistic, so further increases in $\tau_4$ have no effect on its trajectory. In the prototype embodiment, seal occurs at t=1760 μs, just 80 μs later than the nominal falling edge of pulse 4, so $PWM_4 < 80$ μs. In summary, the limitations on pulse-width modulation for this embodiment are as follows:

$$\begin{aligned} -80\ \mu s &< PWM_1 < +100\ \mu s \\ -80\ \mu s &< PWM_2 < +50\ \mu s \\ -80\ \mu s &< PWM_3 < +50\ \mu s \\ -80\ \mu s &< PWM_4 < +80\ \mu s. \end{aligned} \tag{7}$$

Figure 14:
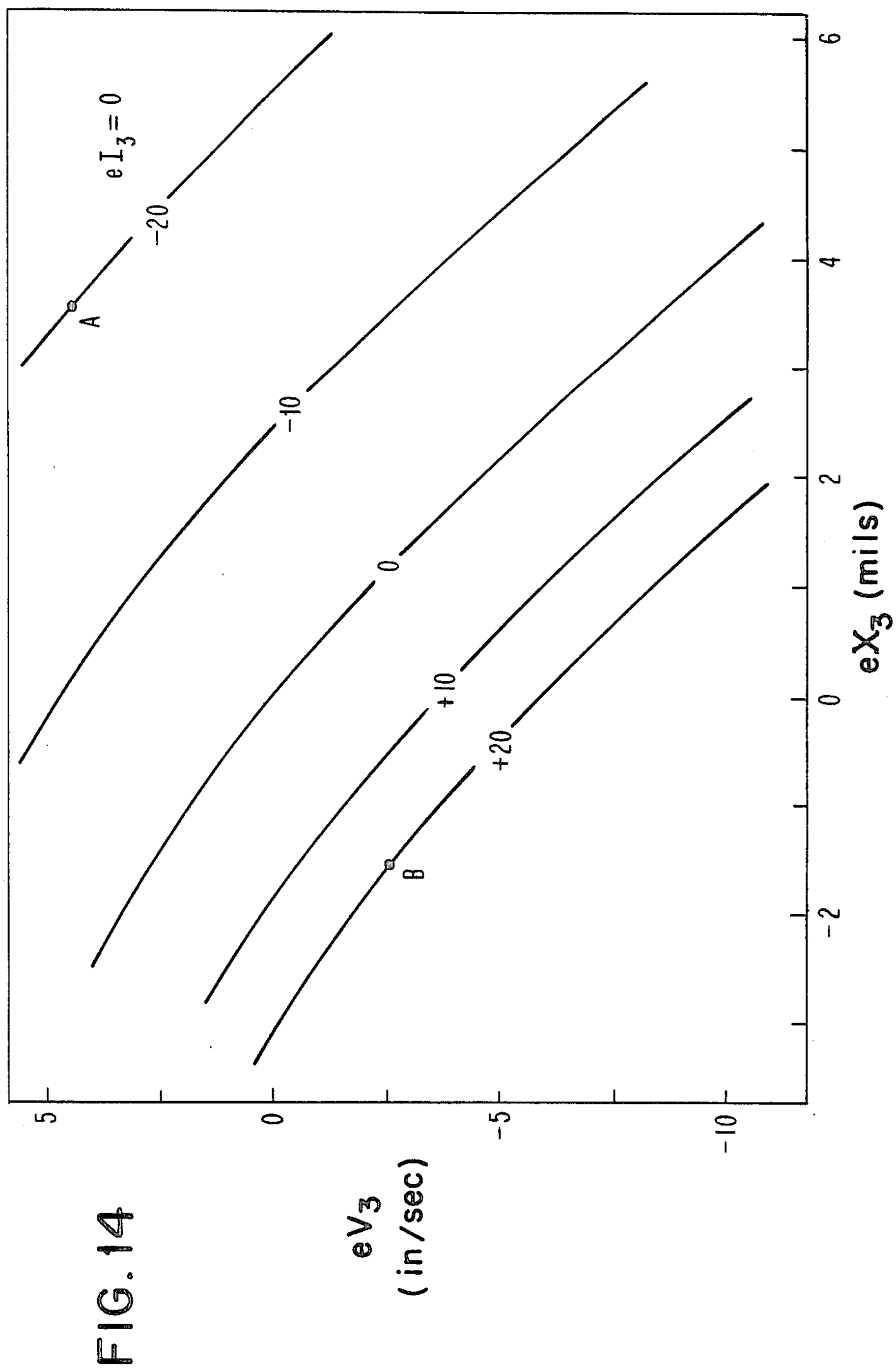
FIG. 14 through FIG. 16 show typical two-dimensional sections of a three-dimensional control function for $i=3$, as derived for the prototype embodiment.
Figure 15:
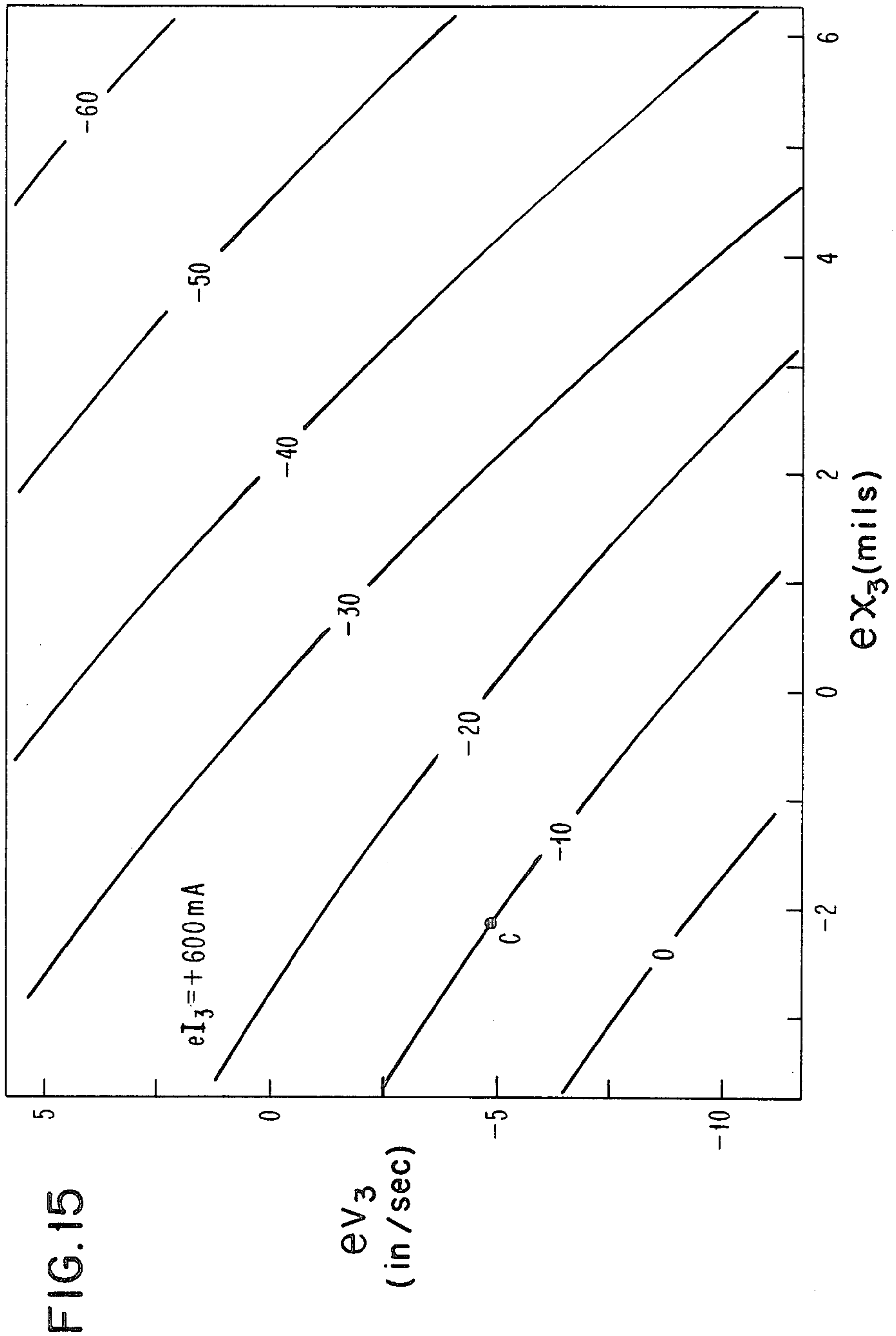
Figure 16:
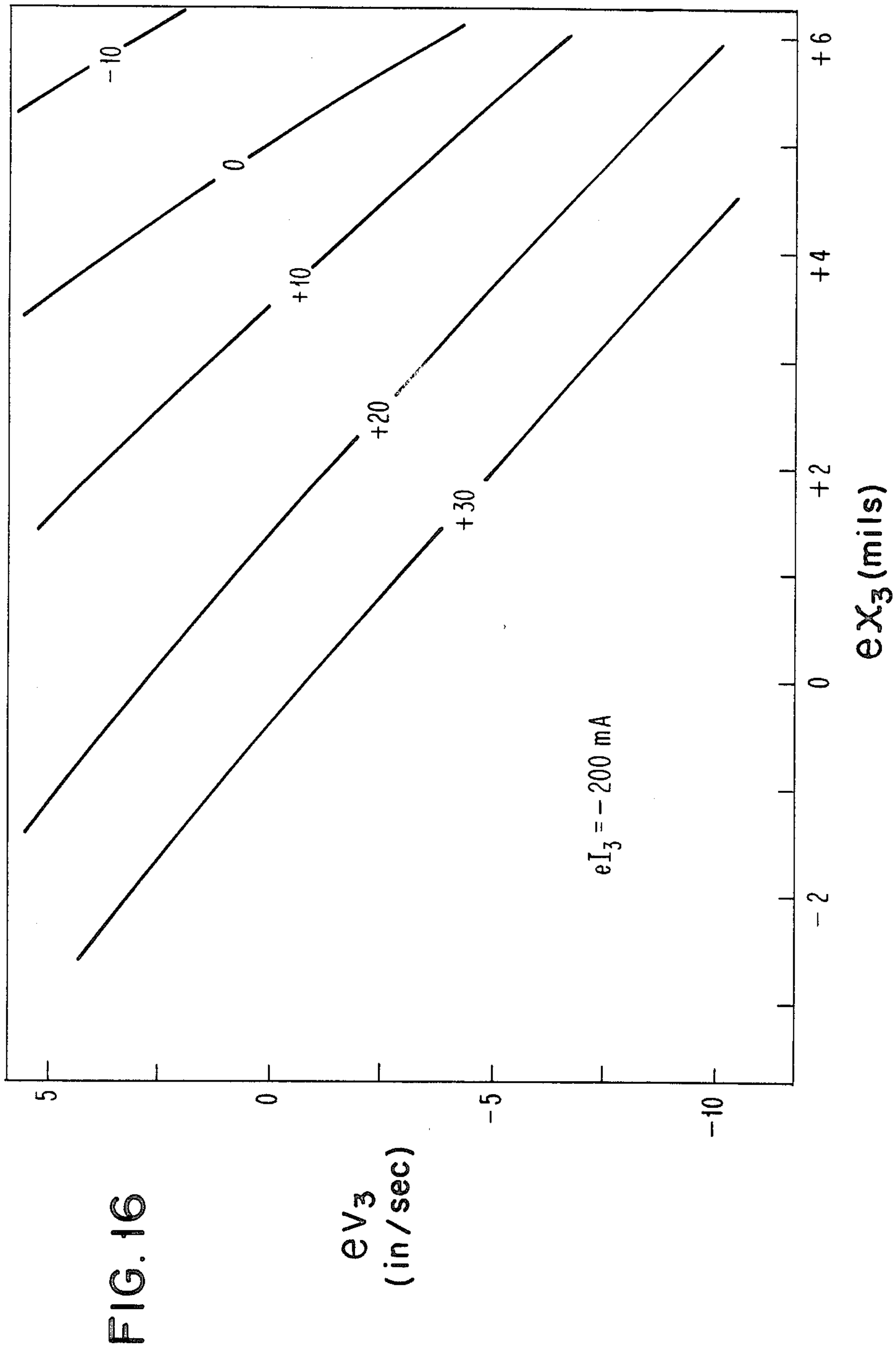
Figure 17:
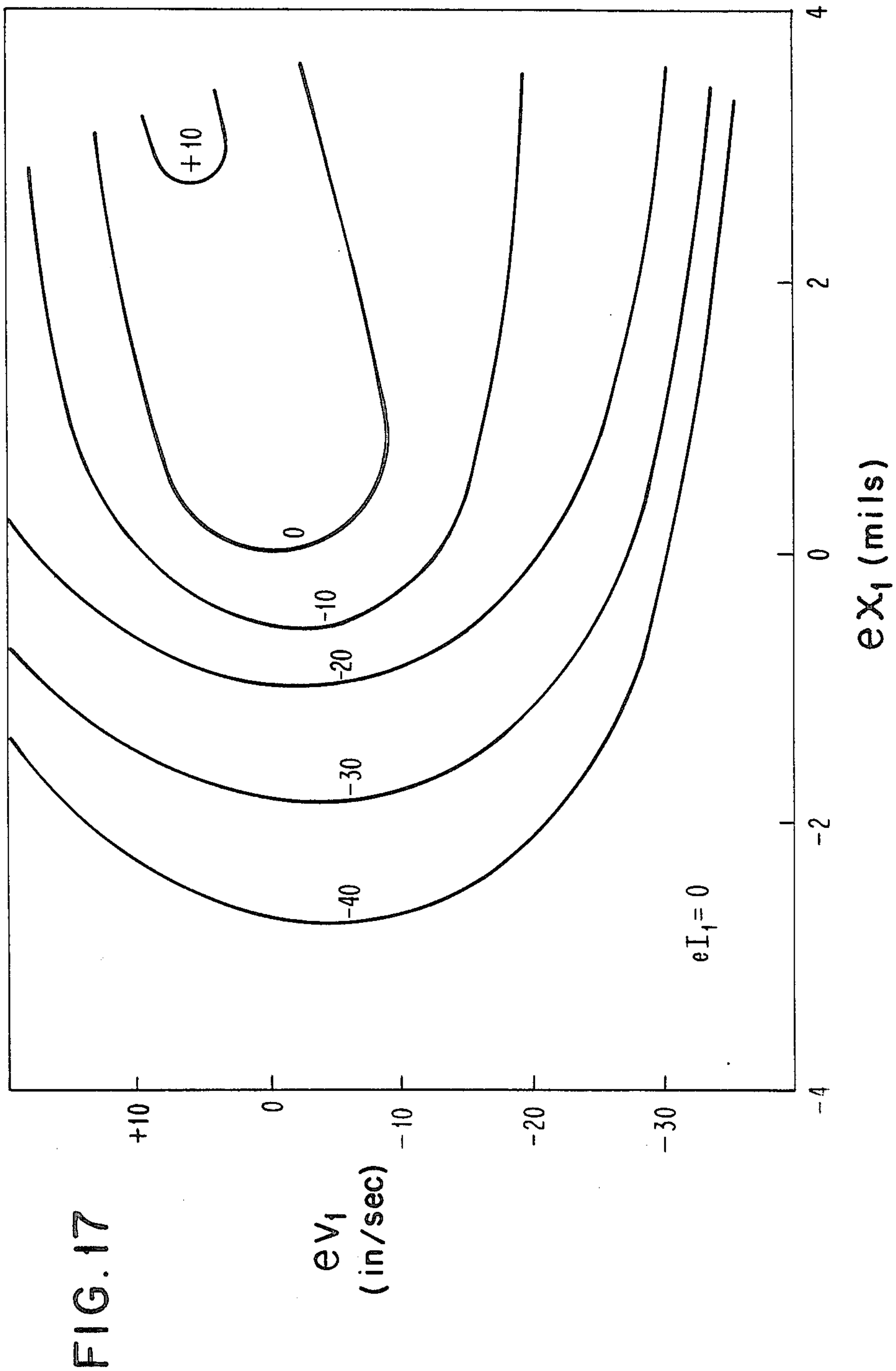
FIG. 17 shows a typical two-dimensional section of the three-dimensional control function for $i=1$, as derived for the prototype embodiment.

Typical results of the trial-and-error procedure (4) are given as contour plots in FIG. 14 through FIG. 17. These results are obtained using the "uncooperative" type of acceptance criterion described above. In particular, a trial value of $PWM_i$ is accepted if, unassisted by modulations of other pulses, it produced the correct flight time to within 15 μs of the ideal value. Each of the plots represents a two-dimensional section of one of the three-dimensional control functions $PWM_i = f_i(ex_i, ev_i, eI_i)$, with $eI_i$ held constant. Specifically, FIG. 14 through FIG. 16 represent three sections of the control function for the third pulse in the pulse train: $f_3(ex_3, ev_3, 0)$, $f_3(ex_3, ev_3, +600\text{ mA})$, and $f_3(ex_3, ev_3, -200\text{ mA})$ respectively. These results are typical of pulses late in the trajectory: the contour lines are nearly straight. In contrast, FIG. 17 represents a section of the control function for the first pulse in the pulse train: $f_1(ex_1, ev_1, 0)$. This result is typical of pulses early in the trajectory: the contour lines are significantly curved.

All of these results make good physical sense. For example in FIG. 14, when the position and velocity error are both positive (i.e. when the hammer is both ahead of schedule and moving too fast at the time of measurement), as at point A, then the correct feedback repsonse is to shorten the pulse width ($PWM_3 = -20$ μs), in order to impart less electromagnetic energy to the hammer. Conversely, when the position and velocity error are both negative (i.e. when the hammer is both behind schedule and moving too slowly at the time of measurement), as at point B, the correct feedback repsonse is to lengthen the pulse width ($PWM_3 = +20$ μs).

For positive and negative values of current error, as represented by FIG. 15 and FIG. 16 respectively the contour plot is shifted in the expected directions. For example, if the current error is positive, as in FIG. 15, then the hammer is being driven by a larger than nominal force, so the pulse-width modulation may need to be negative (as at point C) even though position and velocity errors are both negative.

The curved contour lines on FIG. 17 are explainable in terms of rebound from the backstop. Nominally $(\bar{x}_1, \bar{v}_1) = (0, 0)$; that is, the hammer is at rest against the backstop at t=0. Thus negative position error in FIG. 17 corresponds to compression of the backstop, as may occur during settle-out from a previous actuation. Backstop compression introduces a strong nonlinearity into the equations of motion (the last term in eq. (1a)), which is manifest as nonlinear contours in FIG. 17. The greater the compression at t=0, and the greater the magnitude of the velocity (of either sign), the greater the impulse of the rebound force, and thus the greater the reduction in pulse width needed to produce the correct flight time.

Departures from the Preferred Embodiment

In the preferred embodiment described above, an electromagnetic actuator for impact printing is described, and control objectives relevant to impact printing are discussed. However, the ideas suggested by this invention are not restricted to actuators for impact printing, nor are the objectives restricted to the control of flight time and impact velocity.

Also in the preferred embodiment, a single ideal trajectory is defined. However in certain applications, such as impression control for impact printers, where characters of different sizes require different impact velocities, it may be desirable to define a number of ideal trajectories, and to provide software means for automatic selection of the appropriate ideal trajectory, prior to each actuation, to meet the particular requirements of that actuation.

Also in the preferred embodiment, the state variables are measured at a time which is coincident, or nearly coincident, with the rising edge of each driving pulse, in order to maximize the time available for computation of the control function $f_i$, and also to permit an adequate margin for negative modulation of the pulse width (see FIG. 9). However in certain cases, such as single-pulse actuation (N=1), it may be preferable to delay the measurement of the state variables somewhat, for the purpose of incorporating information about mid-flight disturbances, in addition to initial disturbances, into the measurements.

Also in the preferred embodiment, three state variables—position, velocity, and current—are measured. However, in certain cases, such as single-pulse actuation in a system where the coil voltage is well regulated, it may be unnecessary to measure current. In other cases, it may be necessary to include the effects of additional state variables, such as coil voltage and coil temperature, which may be easily accommodated by the control mechanism.

In general, while the invention has been shown and described with respect to a preferred embodiment with variations, it should be understood that other variations, within the scope of state-variable feedback by means of pulse-width modulation to regulate the trajectory of an electromagnetic actuator, are possible without departing from the invention.

What is claimed is:

1. A system for controlling the dynamics of an electromagnetic actuator having a related armature, coil and driver, in which the armature moves by activation of the related driver which energizes the related coil in response to a pulsed, driver-control waveform signal, certain aspects of the armature motion being affected by disturbances which cause the trajectory of the armature to depart from an ideal trajectory which the armature should follow, the system comprising:

transducer means (2,34,53) for sensing at least one state variable and providing an output responsive thereto;

digitizing means (3), connected to said transducer means, for digitizing the transducer means output and providing a digital transducer output signal;

memory (6) for storing digital reference values defining an ideal trajectory;

computer means (4), connected to said digitizing means (3) and to said memory (6), arranged to compare the digital transducer output signal with the digital reference values, and to provide a control signal which causes the driver-control waveform signal to be pulse-width modulated in response to the comparison;

a programmable timer (7), connected to said computer means, for producing, responsive to the control signal, a pulse-width modulated, driver-control waveform signal; and actuation means, including the related coil, connected to said programmable timer for energizing the coil in response to the pulse-width modulated, driver-control waveform signal, whereby the trajectory of the armature is urged, by the driver-control waveform signal, to substantially follow the ideal trajectory.

2. A system according to claim 1 wherein there are a multiplicity of actuators, and wherein one or more of said digitizing means (3), said programmable timer (7) and said computer means (4) is multiplexed for a plurality of actuators.

3. A system according to claim 1 wherein said computer means (4) include means to calculate, in real time, the control signal for said programmable timer (7).

4. An actuator system according to claim 1 wherein said memory (6) includes lookup tables of pulse-width-modulation values, and said computer means (4) addresses the lookup tables by comparison of the armature and ideal trajectories, thereby providing the control signal to said programmable timer (7).

5. A system for controlling the dynamics of a group of electromagnetic actuators, each actuator having a related armature, coil and driver, in which system an armature is displaceable from an initial position by electrical activation of the related coil, comprising:

means for providing a coil-energizing waveform signal as a succession of pulses denoted sequentially by the index i and which being at fixed times $t_i$ with respect to the start of the activation, means for modulating each pulse to have a variable duration $\tau_i$ determined on-the-fly as a function of a vector state-variable errors $e_i$ observed at a pre-defined observation time $t_i^*$ fixed with respect to the start of said pulse, said errors being computed by reference to an ideal trajectory which the armature should follow, and means for regulating the armature trajectory responsive to the pulse duration modulated coil-energizing waveform signal whereby the armature trajectory is urged to substantially follow the ideal trajectory.

6. A method for automatically deriving the control functions $f_i$ required to achieve the desired regulation of actuator dynamics, comprising the following steps:

calibrating an ideal trajectory which an accelerating mass forming a portion of the actuator should follow, by energizing the actuator in the absence of perturbations using a nominal energizing waveform signal made up of a series of pulse having pre-defined, nominal pulse widths $\tau_i$, whereby the ideal trajectory is energized, thereby allowing the state variable describing the ideal trajectory to be measured at the pre-defined observation times $t_i^*$, and the results of the measurements to be stored as digital statements in memory;

performing a trial-and-error procedure for each pulse i in the energizing waveform for the purpose of obtaining experimental data describing the control function $f_i$, in which various combinations of state-variable errors $e_i$ for pulse i are deliberately and systematically produced at the observation time $t_i^*$ by means of perturbation parameters, each combination of perturbation parameters being applied while energizing the actuator a number of times with each actuation employing a slightly different width $\tau_i$ of pulse i (all subsequent pulses held fixed at their nominal widths), thereby to determine which values of pulse width $\tau_i$ counteract the given combination of state-variable errors $e_i$ with adequate success, success being defined according to an acceptance criterion in which the actuator follows the ideal trajectory within predetermined limits; and performing a statistical procedure for fitting the experimental data collected by the trial-and-error procedure, whereby the data relevant to each pulse of the energizing waveform are fit separately with a piece-wise smooth function, thereby interpolating and extrapolating the experimental data, such that during subsequent, feedback-controlled operation, the appropriate values of pulse widths $\tau_i$ may be determined for any combination of the state-variable errors $e_i$.

7. A method for automatically deriving, through selective pulse-width-modulation of a succession of n pulses, the control functions $f_1, \ldots, f_n$ and the acceptance windows $\Delta_1, \ldots, \Delta_{n-1}$, to achieve desired regulation of actuator dynamics comprising the following steps:

(a) deriving an ideal trajectory which an accelerating mass forming a portion of the actuator should follow in terms of a succession of n pulses having pre-defined widths;

(b) deriving, by causing and measuring disturbances of actuator motion, a set of data points which partially describes a control function for pulse n, and at the same time circumscribes an acceptance window $\Delta_{n-1}$;

(c) iterating step (b) for earlier pulses $n-1, \ldots, 1$; and (d) providing, through regression analysis, a complete description of the control functions $f_1, \ldots, f_n$;

whereby pulse-width modulation of the n pulses according to the control functions causes the actuator trajectory to substantially follow the ideal trajectory with an acceptable deviation.

* * * * *